United States Patent [19]

Gross et al.

[11] Patent Number: 5,147,205
[45] Date of Patent: Sep. 15, 1992

[54] TACHISTOSCOPE AND METHOD OF USE THEREOF FOR TEACHING, PARTICULARLY OF READING AND SPELLING

[76] Inventors: Theodore D. Gross, 2372 Bahia Dr., La Jolla, Calif. 92037; Keith Rayner, University of Massachusetts, Amherst, Mass. 01003

[21] Appl. No.: 475,298

[22] Filed: Feb. 2, 1990

Related U.S. Application Data

[63] Continuation-in-part of Ser. No. 150,387, Jan. 29, 1988, abandoned.

[51] Int. Cl.$^5$ .............................................. G09B 5/00
[52] U.S. Cl. ................................ 434/169; 434/179; 434/307; 358/165; 340/723; 364/419
[58] Field of Search .............. 434/167, 169, 178, 179, 434/180, 181, 182, 236, 307; 340/709, 723, 724, 726; 358/126, 158, 183, 165; 364/200 MS File, 900 MS File, 419

[56] References Cited

U.S. PATENT DOCUMENTS

| | | | |
|---|---|---|---|
| 2,162,766 | 6/1939 | Taylor | 434/182 |
| 3,878,327 | 4/1975 | Uhler | 434/179 X |
| 3,938,139 | 2/1976 | Day | 434/179 X |
| 4,151,659 | 5/1979 | Leen et al. | 434/178 |

OTHER PUBLICATIONS

"The Metron-O-Scope" by American Optical Company, 1935, pp. 8, 16, 17 and 20–23.

Primary Examiner—Richard J. Apley
Assistant Examiner—Joe H. Cheng
Attorney, Agent, or Firm—William C. Fuess

[57] ABSTRACT

A computerized tachistoscope presents information in a transitory, flashed, manner in order to mandate student-user attentiveness, retention, and learning. Particularly in teaching reading successive groups of words, typically of three words each, are transitorily successively presented in positions actually occupied by the word groups within a block of text. Required reading is unidirectionally forward while each successive fixation of the eye must assimilate multiple, and not individual, words. Particularly in teaching spelling a word image is flashed and a student-user is quizzed to spell the word, which word is no longer visible. In teaching reading the base rate of the transitory presentation of successive groups of words is intermittently automatically accelerated, normally about 10% for the successive presentations of many successive word groups, in order to force the student-user to sprint, and to thereby extend his or her reading rate. The latency time duration of the presentation of certain word groups are automatically extended, typically by 50%. The word groups for which display time is extended have keywords, punctuation, and/or length in excess of a predetermined number, normally twenty-six, characters.

37 Claims, 22 Drawing Sheets

PVA TECH EDUCATIONAL SYSTEMS PRESENTS

FLASH READING 1

ONE OF A SERIES OF FLASH-READ™ EDUCATIONAL PROGRAMS

© 1987 PVA TECH EDUCATIONAL SYSTEMS

SCREEN: FR MESSAGES 1

Figure 2

This is a FLASH training program and my name is GEORGE... what's yours

Please enter your name...      Sandy

Please enter today's date...   January 1, 1988

SCREEN: FR MESSAGES 2

Figure 3

```
I am very glad to meet you Sandy.   Are you familiar
with this program?  If so, just enter the number 1.  If
you need more information, enter 2.

1 - If you are ready to start reading

2 - If you need more information

Enter your number here ........ 2
```

SCREEN: FR MESSAGES 3

*Figure 4*

```
During this drill I will flash groups of three to five
words  at  a  time  on  the  screen.   The  word  groups
comprise the sentences of the story and are of course
in order to retell the story.  You will have a chance
to select the speed at which I will flash the words.
If you find that you have selected the wrong speed you
will have several chances to return to the start of the
program and select a different speed.  After you have
completed the reading part of the drill I will give you
a ten question quiz on the story.  If you don't think
you know the answer to a question guess.  You will be
very surprised to learn that you did in fact read the
information required and your guess was based on your
actually seeing the sentence for a very brief moment.
Be certain that you answer the questions using capital
letters  or  I  will  mark  them  wrong.    Neatness  does
count.  Upon completion of the test I will give you a
report  on  how  well  you  did.   I  can  either  write  the
report on the screen of if you desire I can write the
report using your printer.  Let me know what you want
to do when we get to that part of the drill.
WHEN YOU ARE READY TO GO TO WORK JUST PRESS RETURN...?
```

SCREEN: FR MESSAGES 4

*Figure 5*

Now this is a variable speed reading drill and you get to choose the speed at which you want to read. Please select and enter the number from the list below that is in the correct range for your reading skill.

```
0 - SUPER FAST SPEED READER
1 - SPEED READER
2 - UNIVERSITY STUDENT
3 - HIGH SCHOOL STUDENT
4 - JUNIOR HIGH STUDENT
5 - NEW READER
```

At what level do you want to read?  Just enter the number..... 5

SCREEN: FR MESSAGES 5

FIGURE 6

Now we will get ready to FLASH-READ.  Get yourself comfortable.  When you are ready just press return/enter and watch for the words.

SCREEN: FR MESSAGES 6

Figure 7

When a 13-year-old

SCREEN: FR TEXT 1

Figure 8

Virginia girl started

SCREEN: FR TEXT 2

Figure 9

```
                                    sneezing, her parents
```

SCREEN: FR TEXT 3

Figure 10

```
Okay, we will now have a little test on the story.  I
will also give you a copy of the test questions and
correct the test.  Be certain that you answer the
questions using CAPITAL letters.

If you are ready just press enter.  Then answer the
questions.
```

SCREEN: FR MESSAGES 7

Figure 11

1 - At the start of the reading a little girl was mentioned. How old was she reported to be?

A - 14
    B - 13
    C - 12
    D - 11

Your answer is ... B

SCREEN: FR QUESTIONS 1

Figure 12

2 - What state was the little girl from:

A - Ohio
    B - New York
    C - Florida
    D - Virginia

Your answer is... D

SCREEN: FR QUESTIONS 2

Figure 13

```
Wow, you got one hundred on the test.   That is an
outstanding level of comprehension.  I am very proud of
you.

WELL DONE, WELL DONE
```

SCREEN: FR MESSAGES 8

Figure 14

```
That was a good try.  But you did not answer all of the
questions correctly.  I would suggest that you read the
story again.  Try very hard to see groups of words.  If
you have a printer, then I will give you a written
report.  Please get the printer ready.  If you don't
have a printer, then I will write the report on the
screen for you.  Now make your choice from the list
below.

A - HAVE A WRITTEN REPORT ON YOUR PRINTER
     B - HAVE A REPORT ON THE SCREEN

Enter your choice here - use CAPITAL letters ...B
```

SCREEN: FR MESSAGES 9

Figure 15

Dear Sandy: During this reading exercise you read at an average speed of about 10 wpm. I am sure that SURPRISES you but I think you will do even better with practice. The test results indicate that you were reading with a comprehension level of 90%. ISN'T that surprising? I'll bet you had no idea that you could read that fast and understand what you read and remember it. Well, it's been fun; let's do it again sometime.

SANDY

P.S. If you would care to read the story again and try to get 100%, just enter Y. If you are done, enter N.

SCREEN: FR MESSAGES 10

Figure 16

PVA TECH EDUCATIONAL SYSTEMS PRESENTS

FLASH SPELLING 1

ONE OF A SERIES OF FLASH-SPELL™ EDUCATIONAL PROGRAMS

© 1987 PVA TECH EDUCATIONAL SYSTEMS

SCREEN: FS MESSAGES 1

Figure 17

```
This is a speed training program and my name is
GEORGE... what is your name please?

Please enter your name... David

Please enter today's date... January 1, 1988
```

SCREEN: FS MESSAGES 2

Figure 18

```
I am very glad to meet you, David.  Are you familiar
with this program?  If so, just enter the number 1.  If
you need more information, enter 2.

1 - If you are ready to start reading
     2 - If you need more information

Enter your number here ... 2
```

SCREEN: FS MESSAGES 3

Figure 19

As you know, this is a combination spelling and vocabulary building program. The approach is very simple. I will first show you a word. Then I will ask you to type the word as you see it. You must pay close attention to Capitals. If I use a capital letter and you don't, I will mark it wrong and visa versa. Study the word as you see it and don't try to go too fast.

After you have seen the words twice and you can spell the words I will give you the definition of each of the words. You must learn the definitions because I will give you a test on them. Read all of the instructions carefully and have fun.

If you are ready to go to work, press enter/return....?

SCREEN: FS MESSAGES 4

Figure 20

I will now show you each word that we are going to study. After I type the word on the screen you do the same thing, David. Remember to use capitals if I do or I will mark them wrong. There will be ten words in this drill.

The word is........................ accept
You type the word.................. accept

SCREEN: FS MESSAGES 5, FS STATIC WORD 1

Figure 21

```
The word is....................... already
You type the word.................. already
```

SCREEN: FS STATIC WORD 2

*Figure 22*

```
Ok, David, now I will add something else.  I will flash
the word and you then type what you see.  If you get
the word correct I will give you the word's definition.
When you are ready, just press return and away we
go....
```

SCREEN: FS MESSAGES 5

*Figure 23*

```
The word is.................. accept
```

SCREEN: FS FIRST FLASH WORD 1

```
Enter the word.............. accept

The word means to regard as true or valid or to regard
as normal.  Ready for the next word... press enter....
```

SCREEN: FS TEST SPELLING FIRST FLASHED WORD 1,
FS DEFINITION WORD 1

```
The word is..................... already
```

SCREEN: FS FIRST FLASH WORD 2

```
Enter the word.................. already

The word means previously; before the present time.

Ready for the next word... press enter/return....
```

SCREEN: FS TEST SPELLING FIRST FLASHED WORD 2,
        FS DEFINITION WORD 2

```
Okay.   You have done very well with your learning
drills.   Now we will have a little test.   The first
part of the test will cover only the spelling words.  I
will flash them for you just as before, just a little
faster.   There will be twenty flashes but only ten
words.  You will only have one chance for each flash
and I will correct your test and the end of the second
part of the test which will cover the vocabulary or
definitions.   I will tell you about that part of the
test when you finish the spelling...  Why don't you
rest for a moment, when you are ready, press return/
enter.......?
```

SCREEN: FS MESSAGES 7

*Figure 28*

```
The word is.................. beautiful
```

SCREEN: FS SECOND FLASH WORD 1

*Figure 29*

```
Type the word you saw................. beautiful
```

SCREEN: FS TEST SPELLING SECOND FLASHED WORD 1

Figure 30

```
Your score on the spelling test was 70%.  Not 100%.  I
would rather not go on to the vocabulary test.  At this
point you can do the drill over or just do the test
over, or if you would rather just end the drill and do
it some other time we could do that.  You will find
your choices below.  Select the number and enter it.

1 - Repeat the drill
     2 - Repeat the test
     3 - End the drill

Enter the number you have selected......... 3
```

SCREEN: FS MESSAGES 8

Figure 31

Okay. It has been a lot of fun. Let's do it again sometime real soon.

SCREEN: FS MESSAGES 9

Figure 32

I am very proud of you, David -- you scored 100% on the spelling portion. Now you are ready for the vocabulary test. We are going to use the ten words that you have learned to spell and that I have defined for you in the drill. I will write a sentence on the screen and I will omit one word. That word will be one of the words we have just studied. You must then enter the correct word. Be careful that you spell the word correctly. I will mark the sentence wrong if you misspell the word. David, please read these instructions again before we go on. You will only have one chance at each sentence so take your time.

Press the enter/return key when you are ready to go on....?

SCREEN: FS MESSAGES 10

Figure 33

```
1 - The news is of _____ to the issue under
consideration.    The  missing  word  is..............?
concern
```

SCREEN: FS VOCABULARY TEST WORD 1

*Figure 34*

```
2 - Congress  may  not  _____  the  report.    The
missing word is...........? consider
The word should have been........ accept
```

SCREEN: FS VOCABULARY TEST WORD 2

*Figure 35*

```
Alright we have completed the vocabulary test.  And you
scored 50%.  Now, if you will get the printer READY I
will give you a written report.  Now, if the printer is
all set just press the return/enter key.
```

SCREEN: FS MESSAGES 11

*Figure 36*

```
The word was_____.    You entered

1 - concern          1 - concern
         2 - accept           2 - consider
         3 - already          3 -
         4 - beautiful        4 -
         5 - fulfill          5 -
         6 - except           6 -
         7 - disease          7 -
         8 - doctor           8 -
         9 - carrying         9 -
        10 - either          10 -
```

SCREEN: FS MESSAGES 12

*Figure 37*

Dear David:

I want you to know that I really enjoyed working with you on this drill. As you understand from the instructions you did get 100% on the spelling test. That is what allowed you to go on to the vocabulary test. Now, you scored 50% on the vocabulary test. I will give you a copy of the words as I gave them to you and a list of the words that you entered. It is also interesting to note that you devoted 8 minutes to this exercise. It's been fun DAVID. LET'S DO IT AGAIN SOON.

SCREEN: FS MESSAGES 13

Figure 38

TACHISTOSCOPE AND METHOD OF USE THEREOF FOR TEACHING, PARTICULARLY OF READING AND SPELLING

REFERENCE TO RELATED APPLICATIONS

The present application is a Continuation-In-Part of U.S. patent application Ser. No. 150,387 filed Jan. 29, 1988, now abandoned.

BACKGROUND OF THE INVENTION

1. Field Of The Invention

The present invention relates to apparatus and methods for teaching by brief, flashed, visual presentation of information, primarily textual information. The present invention more particularly relates to (i) a computer-based tachistoscope for ordered presentation of information, including information briefly exposed to view, particularly for the purposes of teaching reading and spelling, and (ii) automated, tachistoscopic, methods for the presentation of information.

2. Background Of The Invention

The previous theory and practice of machine-based instruction, the previous teaching technique of flash cards, and prior knowledge of reading dynamics are all pertinent to the present invention.

2.1 General Characteristics of Previous Machine-Based Instruction

It is known that machines, including computer systems, can aid in delivering educational instruction to students The course of instruction, or teaching regimens, performed by machines generally exhibit certain common characteristics. The instruction is stepwise. A student-user often needs to demonstrate mastery of one piece of information before being allowed to proceed to assimilate further information. The course of instruction may be in a fixed path, with all students being presented the identical information in the identical order, but is not invariably so.

The more sophisticated machine instructional systems employ programmed learning wherein a student-user's evident mastery, or failings, in one area of information respectively result either in an immediate advancement to further related information, or else in a remedial teaching of the information which the student-user has failed to grasp. The sophistication, extent, nature, and quality of the curriculum material taught by machine instructional systems varies widely. However, teaching machines are currently most widely used for the teaching of low level information such as that occurring at the elementary school level.

The production of machine-based instructional programs, or curricula, has generally proven to be an art. Certain programs of machine instruction are vastly more successful than other programs in inducing student-user to learn the identical material. Machine instructional programs may be successful or unsuccessful in varying degrees in accordance with the pace at which materials are presented, the positive reinforcement that is provided to the student-user, and the order in which the materials are presented. A carefully constructed teaching program is necessary in order to engender student-user interest and cooperation, and in order to promote maximum learning.

Nonetheless to careful and painstaking design, machine-based instruction is generally thought to be inferior to human instruction. Part of this inferiority is attributed to lack of the spontaneity that is normally inherent in the dialogue between a human teacher and his or her student. At least part of the superior spontaneity of human dialogue is, no doubt, based on the subtle, non-verbal, interactions that transpire between a qualified teacher and his or her student. The teacher is sensitive to non-verbal or non-written clues regarding the progress of the student, and this sensitivity allows for the better tailoring and adaptation of the curriculum. Particularly, the curriculum may be presented in a unique, or spontaneous, manner for each individual student.

Part of the seeming lack of spontaneity in machine-based instruction may be, however, simply temporal. The machine often behaves somewhat "woodenly" in its presentation of material, and becomes a passive chalkboard-like device in which a rigid series of requests and responses are mandated in order to permit instruction to progress. Machine-based instruction in accordance with the present invention will be seen to require, in some instances, proper student-user responses in order that a sequence of instruction may progress. However, and substantially unlike most previous machine-based instruction, in other instances the apparatus and method in accordance with the present invention will be found to present certain information only momentarily. After the presentation of this information, the instruction will continue—substantially without any mandated interactive student-user response.

The brief and transient, tachistoscopic, visual presentation of certain information in accordance with the present invention (as hereinafter explained) will proceed, at least upon occasion, without waiting for a student-user response. This operation tends to "perk up" the course of information presentation. It challenges the student-user to pay attention to what is going on, and to assimilate the information. This is especially true when, as will be seen to be the case with the present invention, after the once-presented transitory information is removed from the student-user's view the student-user must thereafter answer questions regarding such information. The information must have been assimilated, and must be recalled, in order to allow progress of instruction.

As still another tachistoscopic instructional technique in accordance with the present invention, the successive tachistoscopic presentations of information will be seen to be spontaneously and automatically varied, normally by being speeded up, at intervals. The intervals are typically irregular, and the speed up in presentation is typically for several successive presentations and associated quantums of presented information.

Finally, the display latency time duration of the tachistoscopic presentations will be seen to be variable, and to be variably sensitive to characteristics of the information presented.

Although it is known to adjust the rate of tachistoscopic presentations, with the display latency time of each such presentation being the inverse of the rate, it is not known to automatically, and independently, adjust either or both the tachistoscopic display rate and/or the display latency time durations of the individual presentations.

Resultant to all these variations, machine-based-instruction in accordance with the present invention will be seen to be "lively" and "dynamic", and not "wooden" The tachistoscopic presentations will be seen to vary, in certain temporal and visual characteristics and generally automatically, so as to appear responsive to the requirements of the student user, and not merely capricious or inconstant. The dynamic temporal responsiveness of tachistoscopic apparatus and methods in accordance with the present invention will be found to be firmly based on learning dynamics, and, by such firm foundation, to be extremely friendly and compliant to a student-user. They elicit learning in a manner that may be favorably compared with customized human instruction.

2.2 Previous Flash Card Manual Instructional Techniques

Teaching is an old art, preceding not only machine-based instruction but civilization itself. Therefore a great deal is understood about the efficacy of prior art human-based educational techniques. One such time-honored prior art instructional technique is the use of flash cards. The information upon a flash card is momentarily presented to a student-user, either by his own actions or (as is more common) by the actions of another. The flash card is then repositioned so that the student-user may not read the information thereon, and the student-user is asked a question concerning such information. Such question may be as simple as the repetition of the information upon the flash card (such as to spell the previously exposed word, for example "democracy") or may only be related to the previously exposed information (such as to explain the meaning of "democracy"). In other words, flash cards operate at different levels. The student-user may be asked to respond substantially contemporaneously with the visually exposed information; i.e., to read the word "democracy" The student-user may be forced to a response which, by its innate length, will extend into the period wherein the information is no longer visible; i.e., to spell the word "democracy" after its transitory presentation. Finally, flash cards may be mere "ticklers" for more extensive memory stores. In this case it may not much matter how long the information is exposed to view; i.e., to explain the meaning of "democracy" The utility of the flashed presentation of information is that its assimilation, and retention, is mandated in order that questions concerning such information may be correctly answered by the student-user after the information is removed from view. Flash cards are a proven means of forcing information assimilation, and constitute a rigorous form of instruction which is generally thought to be demanding, and difficult, by student-users.

2.3 Reading Dynamics

The dynamics of reading are also well understood. The manner of the learning, and teaching, of this essential modern skill has been widely studied in all areas: from improving the reading speed comprehension and fact retention of college level readers to the earliest instruction of beginning and/or functionally impaired readers. Certain characteristics of good reading skills are applicable to a broad spectrum of readers, and to a broad range of reading speeds. One such characteristic is that a good reader does not regress in the text read. Rather, the reading progress is always forward. The good reader of any speed level exhibits no reversion of eye movement, or attention, to words, phrases, and/or sentences previously read.

Another characteristic is that a good reader does not read words individually but, upon gaining increasing visual conversance with word images, comes to read words as groups, several at a time. Indeed, the very fastest readers assimilate entire phrases of many words at each movement of the eyes, "grabbing" off large chunks of text material successively throughout the passage read. In the extreme, certain speed readers allege that they do not appreciably read side-to-side, but rather read vertically down a page assimilating entire lines of text at one time. Regardless of how numerous the words, or long the phrases, that are assimilated at one time during reading, even the youngest readers need to be early taught to desist from the reading of individual words, and to instead progress in reading text by mentally processing several words upon each successive fixation of the eyes.

The preferred reading process wherein more than one, and preferably a large number, of words are simultaneously assimilated upon each successive fixation by the text-scanning eye may be equally as well described in terms of the required behavior of the human eye as it may be described in terms of the required thought of the human brain. Mainly, the reader's eye must be taught to "leap" from one fixation point to the next across a line, and down a page, of text. The eye should rest only fleetingly at each fixation point. The text material assimilated around such point should be as broad, including as many words, as is possible. This breadth of reading vision may be called peripheral vision, or the acuity of peripheral vision. Good readers see, and assimilate, broad swaths of the text which they are reading.

Even the youngest readers are beneficially early taught to forego word-by-word progression in reading, and to attempt to read more quickly by assimilating words in groups, and by phrases. It is currently believed that readers who assimilate in broad swaths also enjoy better reading comprehension. That this comprehension variation is not merely an innate difference between individual readers may be demonstrated by the fact that even successful, high speed, readers have difficulty assimilating textual information when they are allowed to read it only but a single word at a time, no matter how slowly and leisurely the information is presented. A good reader who is forced to revert to word-by-word reading not only finds it frustrating, but actually counterproductive to his/her reading comprehension.

It is therefore desirable that a mechanical device for teaching reading should be able both to (i) preclude visual regression within the read text, and (ii) force the eye and mind to assimilate more than one word during each successive fixation of the eye that occurs during the reading of a body of text. The present invention will so function to both prevent that priorly read text should be reread, and, even more importantly, cause that the student-user's reading of the text must effectively proceed by assimilations of multiple words, and cannot effectively proceed single word by single word.

SUMMARY OF THE INVENTION

The present invention contemplates the tachistoscopic presentation of information, particularly successive groups of words constituting text, at (i) a presentation rate that is automatically varied—typically by being intermittently accelerated up to 10% for two or more, and typically many, successively presented groups of words—and/or at (ii) a presentation latency time duration that is automatically varied—typically by being temporally extended up to 50% for the presentation of as few as one single group of words.

The tachistoscopic presentation of information in accordance with the present invention innately tends to force a student-user into paced, non-regressive, learning. Intermittent accelerations in the tachistoscopic presentations tend to force the student-user to "sprint", extending his or her skills. Extensions in the latency time duration of individual presentations are preferably conditioned on any of the (i) significance, (ii) length, and/or (iii) punctuation of a particular quantum of textual information that is being presented. These presentation latency time duration extensions better focus the paced learning that is resultant from the tachistoscopic presentations, and make such learning easier and more natural.

Although tachistoscopes and tachistoscopic methods in accordance with the present invention perform according to rules, the rules implemented are in strong accord with modern knowledge of learning, and particularly reading, dynamics. Tachistoscopic machines and methods in accordance with the present invention present information, and particularly groups of words constituting text, at such (i) exact spatial locations, (ii) granularities of size and (iii) temporal junctures as would be preferred by a skilled learner of the information, or reader of the text. Accordingly, the machines and methods simultaneously (i) show a student-user superior patterns of information assimilation and, to the extent of the student-user's cooperation, (ii) force him or her to adapt these superior patterns.

The instruction implemented by tachistoscopic machines and methods in accordance with the present invention shows good reading and spelling skills in order to inculcate their development. A student-user of the tachistoscopic machines is not placed in a position of having to surmount, or master, the machine and its rigid curriculum. Instead, the tachistoscopic displays induce fusion in the student-user, inducing a growing recognition of just how reading, and other cognition, is desirably achieved.

Accordingly, the preferred embodiments of the present invention are as a tachistoscope, and a method of tachistoscopic presentation of information, directed to successively presenting visual stimuli (i) at some particular presentation rate between successive presentations, and (ii) at some particular presentation latency time during which each visual stimuli is viewable. The tachistoscope, and tachistoscopic method, (i) automatically varies the particular presentation rate of the successively presenting during the course of the successive presentations, and/or (ii) automatically varies the particular presentation latency time of the successively presenting during the course of the successive presentations.

In the tachistoscope and tachistoscopic method the automatic variation in the presentation rate preferably increases the presentation rate for at least two, and normally for many, selective successive presentations of visual stimuli over that presentation rate, or rates, that the visual stimuli are presented both before, and after, those presentations which transpire more quickly. Similarly, the automatic variation in the latency time preferably increases the latency time of the presentation of as few as one, and normally one single, selective presentation(s) of visual stimuli over that presentation latency time, or times, that the visual stimuli are presented both before, and after, that presentation(s) that is (are) extended.

Still furthermore, the present invention is embodied in an instructional method for teaching reading. In the method of the invention a body of text is organized into lines each containing a multiplicity of words. The multiplicity of words upon each line are divided into successive groups of words, each group containing a plurality of words. The successive groups of words are transitorily successively presented, one group at a time top to bottom down the body of text. Each successive group of words occupies a position during its transitory presentation that is equivalent to the actual position occupied by that group of words within the text line, and also within the body of text.

This manner of presentation requires a student-user who views the presenting to read each successive group of words at and upon, and only at and only upon, the time of their transitory presentation This requirement results because both before, and after, their transitory presentation each group of words is not visible to the student-user.

These and other aspects and attributes of the present invention will become increasingly clear upon reference to the following drawings and accompanying specification.

BRIEF DESCRIPTION OF THE DRAWINGS

FIGS. 2–7 respectively show first through sixth message screens presented by a preferred embodiment of a programmed method in accordance with the present invention for teaching reading.

FIGS. 8–10 respectively show three successive screens of text presented by the preferred embodiment of a programmed method in accordance with the present invention for teaching reading.

FIG. 11 shows a seventh message screen presented by the preferred embodiment of a programmed method in accordance with the present invention for teaching reading.

FIGS. 12 and 13 show two screens of questions presented by the preferred embodiment of a programmed method in accordance with the present invention for teaching reading.

FIGS. 14–16 respectively show three final, eighth through tenth, message screens presented by the preferred embodiment of a programmed method in accordance with the present invention for teaching reading.

FIGS. 17–20 respectively show four, first through fourth, message screens presented by a preferred embodiment of a programmed method in accordance with the present invention for teaching spelling.

FIG. 21 shows a fifth message screen in combination with a first static word screen presented by the preferred embodiment of a programmed method in accordance with the present invention for teaching spelling.

FIG. 22 shows a second static word screen presented by the preferred embodiment of a programmed method in accordance with the present invention for teaching spelling.

FIG. 23 shows a screen presenting a six message in accordance with the preferred embodiment of a programmed method in accordance with the present invention for teaching spelling.

FIG. 28 shows a screen of a seventh message presented by the preferred embodiment of a programmed method in accordance with the present invention for teaching spelling.

FIG. 29 shows a screen of a second flashed presentation of a first word presented by the preferred embodiment of a programmed method in accordance with the present invention for teaching spelling.

FIG. 30 shows a screen of a test of the second flashed first word presented by the preferred embodiment of a programmed method in accordance with the present invention for teaching spelling.

FIGS. 31-33 respectively show screens of eighth through tenth messages presented by the preferred embodiment of a programmed method in accordance with the present invention for teaching spelling.

FIGS. 34 and 35 show screens respectively of a vocabulary test of a first, and of a second, word presented by the preferred embodiment of a programmed method in accordance with the present invention for teaching spelling.

FIGS. 36-38 respectively show screens of eleventh through thirteenth messages presented by the preferred embodiment of a programmed method in accordance with the present invention for teaching spelling.

DETAILED DESCRIPTION OF THE INVENTION

Figure 1:
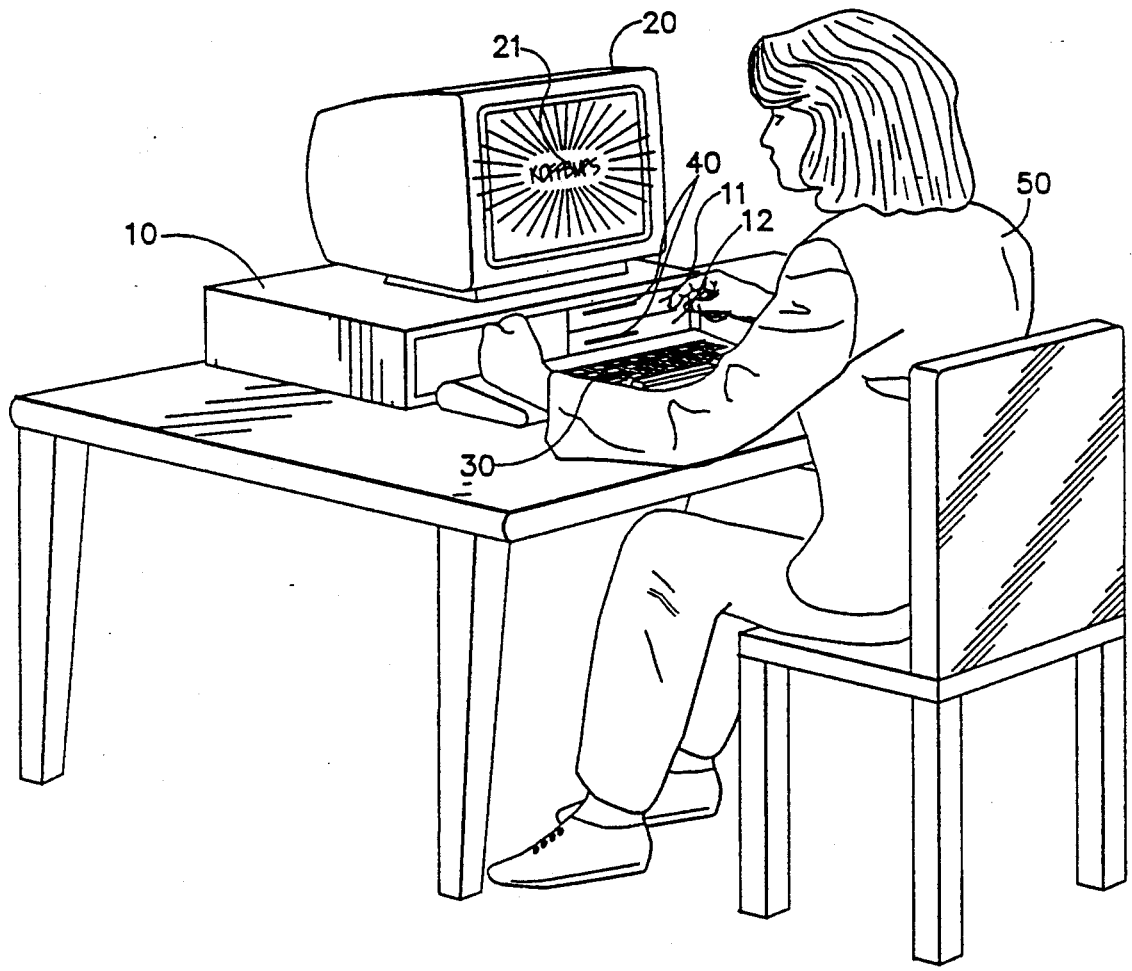
FIG. 1 is a diagrammatic view showing the computerized tachistoscope in accordance with the present invention in operational use.
Figure 24:
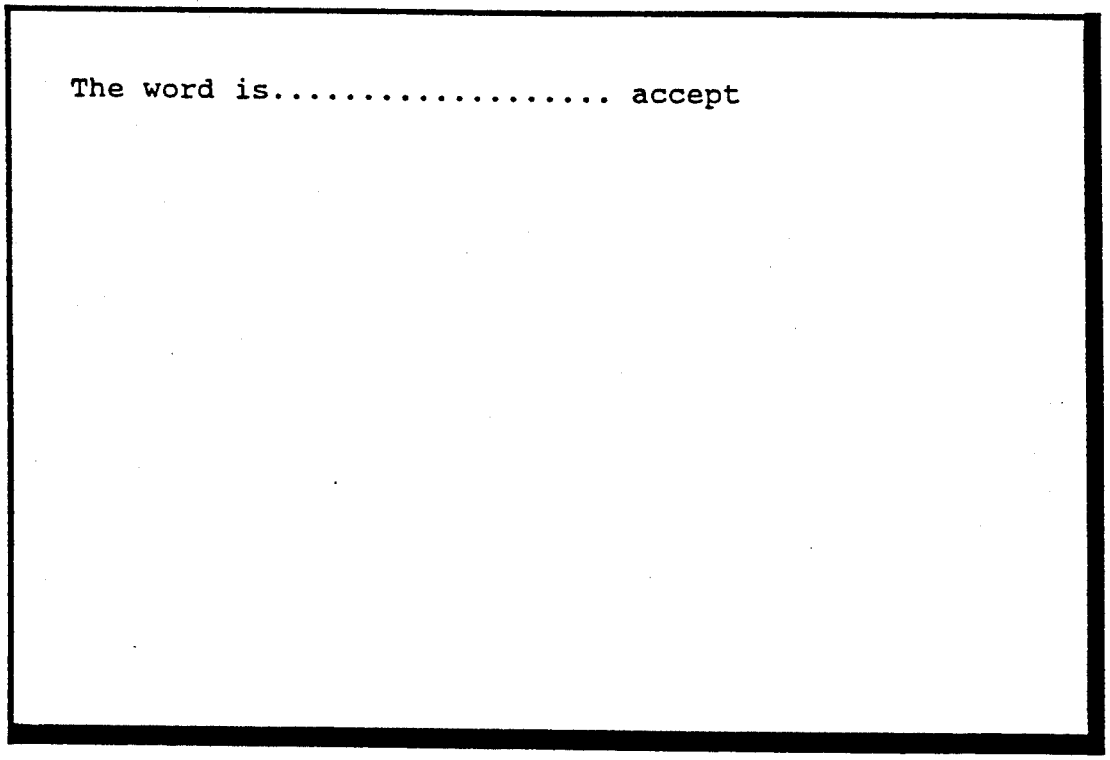
FIG. 24 shows a screen presenting a flashed first word in accordance with the preferred embodiment of a programmed method in accordance with the present invention for teaching spelling.
Figure 25:
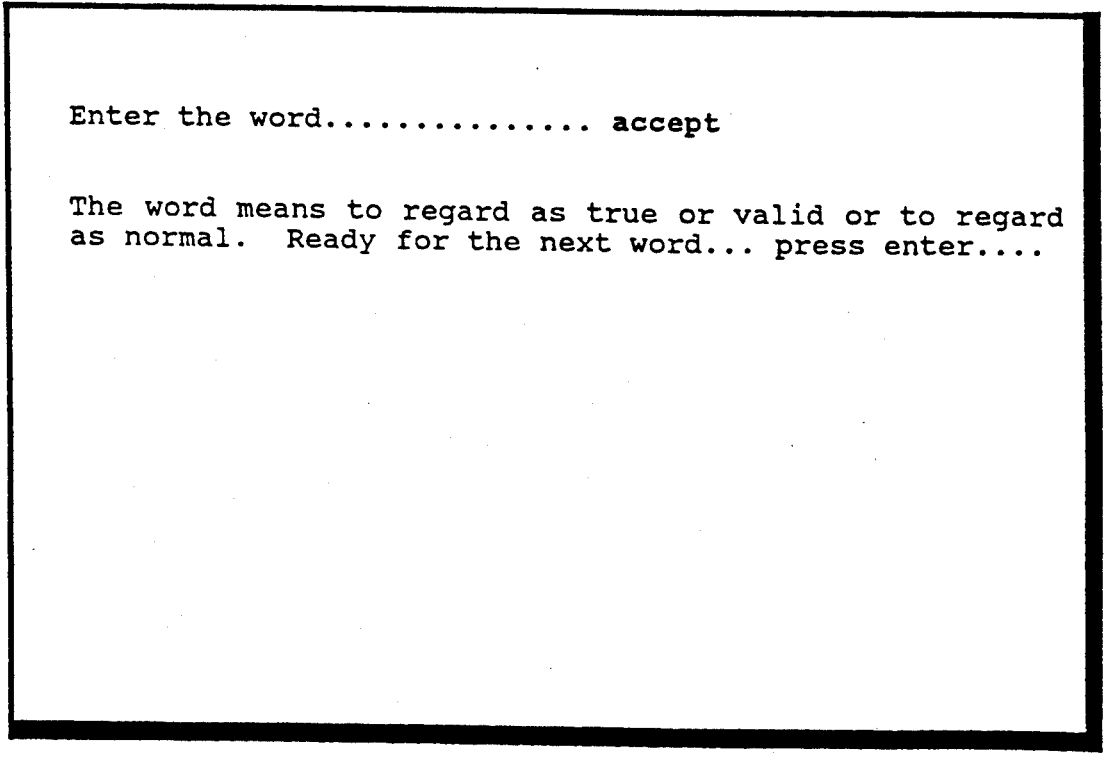
FIG. 25 shows a screen of a test of the first flashed word, plus a definition of that first flashed word, presented by the preferred embodiment of a programmed method in accordance with the present invention for teaching spelling.
Figure 26:
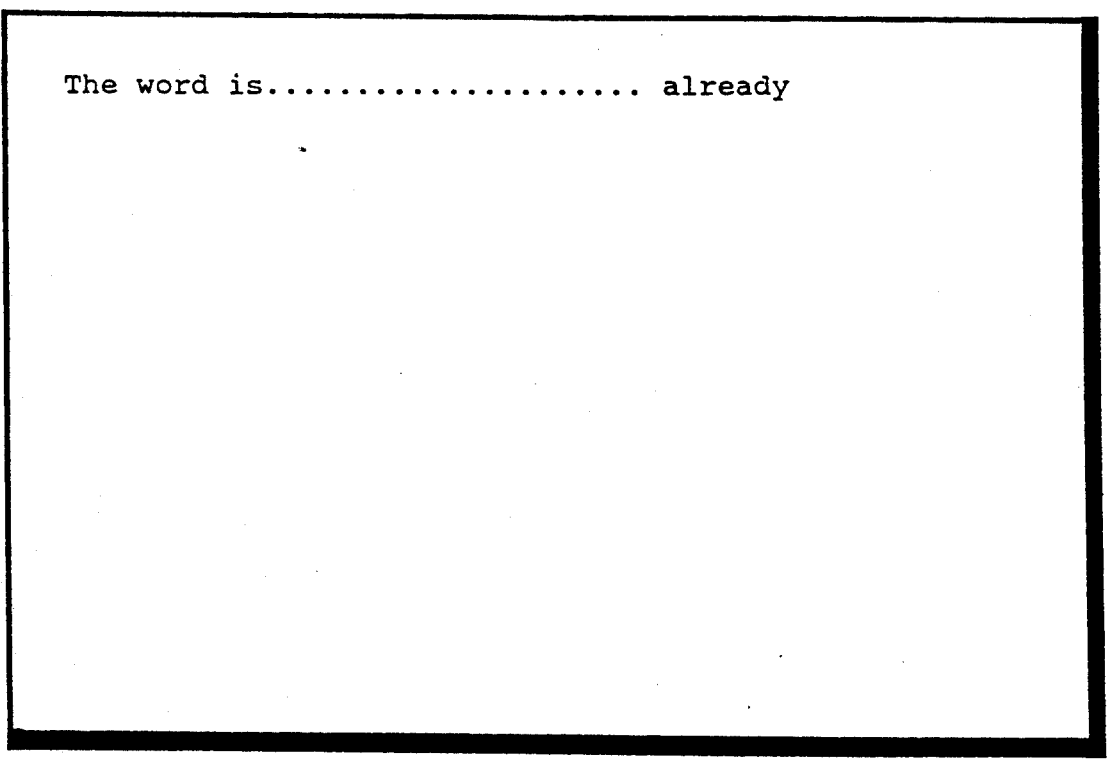
FIG. 26 shows a screen of a second flashed word presented by the preferred embodiment of a programmed method in accordance with the present invention for teaching spelling.
Figure 27:
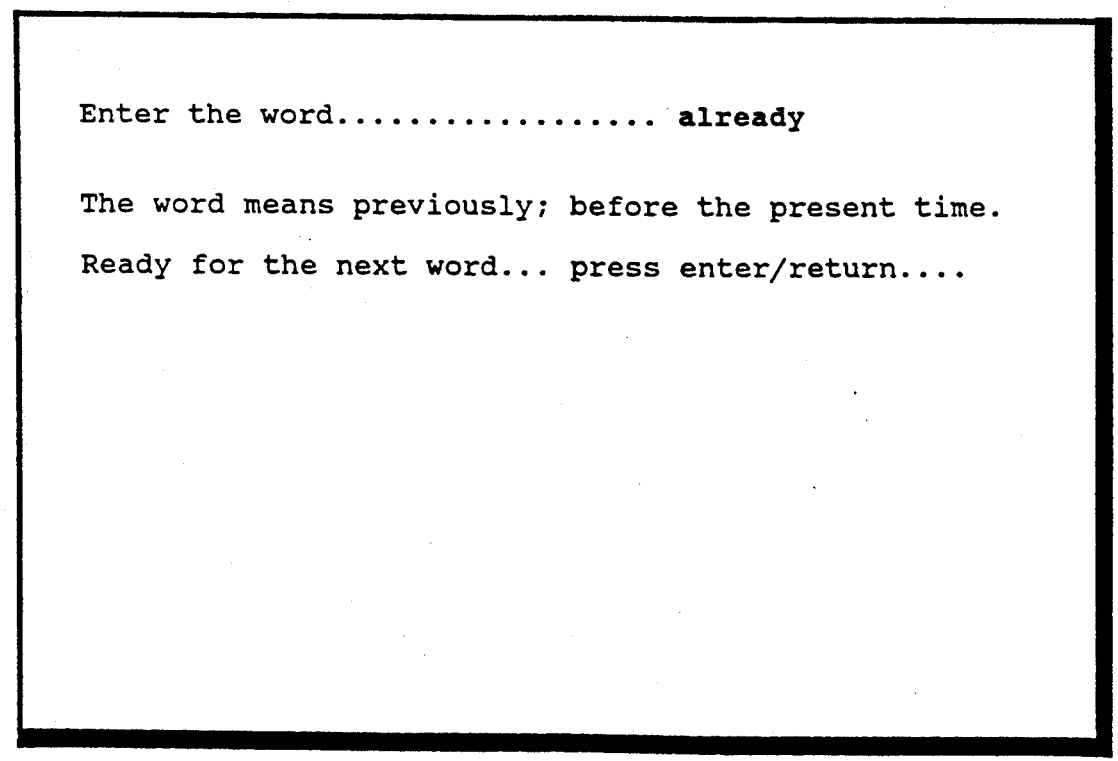
FIG. 27 shows a screen of a test of the second flashed word, and of the definition of such word, presented by the preferred embodiment of a programmed method of the present invention for teaching spelling.

The present invention is embodied in a tachistoscope, or apparatus for the brief exposure of visual stimuli. The tachistoscope is preferably implemented by a computer, and more preferably by a personal computer, system. The visual stimuli displayed on the tachistoscope are either single or multiple words. The words are flashed upon the screen of a monitor for a predetermined display latency time and at a predetermined, preferably at a user-selected, base rate. The displayed words accord educational instruction, preferably in reading or spelling but potentially in diverse disciplines. The user interacts with the system to control the sequence and extent of staged presentations by the tachistoscope, but cannot prevent that some presentations will be only momentary.

One preferred instructional method in accordance with the present invention uses the computer-based tachistoscope for the teaching of reading. A body of text, typically stored in the computer memory, is organized into lines, each of which contains a multiplicity of words. The multiplicity of words upon each line are divided into successive groups of words, each such group containing a preselected number of words, and typically containing three words. Each successive groups of words is transitorily successively presented on the monitor screen to the student-user, one word group at a time. If the student-user viewing the presenting is to successfully read the flashed text then it is necessary that the student-user should read the entirety of each successive word group at and upon, and only at and only upon, the single instance of its transitory presentation. It is obviously impossible for a student-user to regress in the text material read because each word group is no longer visually apparent upon the monitor screen after its single transitory, flashed, presentation. At a certain pace of presenting the successive word groups it becomes essentially impossible that a student-user should be able to keep reading pace unless the entire word group is visually fixated, and mentally assimilated, as a multi-word entity, and not individual word by individual word. By such a forced presentation certain fundamentals of good reading are induced in the student-user. To repeat, not merely speed but also a multi-word granularity of reading is induced in the student-user.

Further in accordance with the preferred method of the present invention for teaching reading, the transitory presentations of successive word groups transpires positionally across each text line; each successive group of words occupying a position during its transitory presentation which is equivalent to that actual position occupied by the group of words within the actual text line. The transitory successive presentations may also, optionally, positionally proceed from top to bottom down the body of the text. In this case each successive group of words occupies a position during its transitory presentation that is equivalent to the actual position occupied by the group of words within the entire body of the text. The natural movement left to right and top to bottom which would be undergone by the eye in normal reading of a block of text is thusly replicated when the student- o user follows the sequentially staged, transitory, flashed, presentations upon the tachistoscope.

Further in accordance with the preferred method in accordance with the present invention for teaching reading, the rate of the transitory presentations of successive word groups will increase slightly, typically ten percent (10%), from pre-set levels intermittently or periodically, typically approximately every three (3) minutes, during the course of the tachistoscope's presentation of an entire block of text. This slight rate variation has several advantages. The student-user of the tachistoscope cannot assume an absolutely regular and invariant rate of successive eye fixations, but must accommodate slight, almost imperceptible, rate changes. These slight changes help to maintain attention and reduce monotony. Furthermore, the student-user will, at least periodically, "sprint" through the test at an increase, typically one hundred and ten percent (110%), over the pre-set presentation rate. Satisfactory performance during the modestly accelerated presentations builds student-user confidence, and accelerates both willingness to attempt faster pre-set rates and attainment of those faster rates. It is as if the tachistoscope prods greater reading performance.

Further in accordance with the preferred method of the present invention for teaching reading, an automated testing of reading comprehension preferably transpires subsequent to the reading exercise. This test of reading comprehension consists of questions preferably directed to information which was within each successive group of words presented, and the questions are preferably in the same relative order as the word groups were presented. By such correlation between testing and presentation certain systematic problems in student-user comprehension—such as problems related to rate of presentation, location of textual material, and/or content of phrases—may be isolated and displayed. The predetermined rate of the transitory successive presentation of the word groups is determined by the individual student-user. Selectable rates range between those suitable for beginning readers to those challenging the most advanced speed readers.

Another, second, preferred instructional method in accordance with the present invention is directed to the use of the tachistoscope, and to the flashed presentation of information, for the teaching of spelling. In accordance with this second method certain basic skills, including keystroking, which permit a student-user to respond correctly in a spelling quiz are nurtured and developed at a time before the student-user needs to use these skills in responding to an actual spelling quiz. The actual spelling quiz is on transitorily presented information. Consequently, it permits little opportunity for the student-user to assimilate required basic skills.

Particularly, a word is continuously statically presented upon a monitor while the student-user is preliminarily tested to spell the word correctly by act of keystroking it upon a computer keyboard. The student-user is accorded as many tries as are required to develop not only the mental knowledge of the word's letters, but also the important motor skills which will allow translation of this mental knowledge into a correctly keystroked word. After, and only after, the student-user has been statically presented a plurality of words, and has evidenced his ability to spell each one during the static preliminary testing, is a transitory presentation of information, and a testing of spelling, then conducted. In the actual spelling test the previously mastered words are dynamically momentarily presented word by word to the student-user. After each word is no longer visible then the student- o user is challenged to spell the word. If the student- o user cannot remember, or cannot successfully keystroke the word, then it is momentarily displayed for as many times as are required until the student-user is able to carry over the mental image of he word from the time of its transitory display to the time of its required entry, and to successfully keystroke the word. Very often this technique highlights certain letter groups of the word regarding which letter groups the student- o user's spelling knowledge, and/or his/her motor skills to replicate, are erroneous.

Further, in accordance with the second preferred method, a successful spelling of each word that has been momentarily presented is rewarded with a static display of the word's definition. At such time as the student-user has evidenced capability to reliably spell all the plurality of words, then the student-user may be further, statically, tested to both (i) use and (ii) spell each of the plurality of words, one at a time, appropriately to the use of the word within a textural context in accordance with the word's definition.

Both the preferred method of instructing in reading, and the preferred method of instructing in spelling, by use of the computerized tachistoscope in accordance with the present invention may be observed to be similar. Particularly, in that the student-user is forced, at least at certain temporal junctures, to assimilate information which is only but momentarily presented so that he/she may later successfully respond to inquiries regarding such information. This manner of instruction has a clear effect of "forcing the brain into gear" There is no way that programmed, flashed presentation, educational exercises in accordance with the present invention can be successfully passed by any individual—no matter how educated or intelligent, or no matter that the individual is already possessed of high skills in reading and/or spelling—unless due attention is paid to the material as and when presented. This is simply to say that no one can successfully answer a question regarding material when such material is no longer visible save that the person has mentally assimilated the material. In the case of a person learning the material for the first time, this forced attentiveness means that the person must assimilate the material as and when it is presented. This is the fundamental nature of learning, which nature is obviously fostered by the tachistoscope apparatus and instructional methods in accordance with the present invention.

The present invention is directed to flashed presentations of information for teaching, particularly for teaching reading and spelling. In accordance with the present invention, a computer system including a computer, monitor and keyboard is programmed to function as a tachistoscope. The computerized tachistoscope is programmed to flash single or multiple combinations of words on the monitor screen at a user- o selected speed. The programmed presentations to the student-user of the computerized tachistoscope also consist of messages, additional non-flashed instructional information, quizzes and summaries of student-user performance.

The present invention functions during either and both the teaching of reading and spelling to force the student-user to mentally acquire, and to at least momentarily retain, transitorily presented information so that the student-user may, subsequently to the momentary presentation of the information, correctly answer questions posited concerning such information. Because the student-user must become actively involved with information acquisition in order that such information may later be used, learning is facilitated. Particularly in accordance with the present invention, the student-user is prohibited from regressing in the presented information, and from shifting his/her attention back and forth between the information and the question in order to answer the question by only superficial transposition of information, and without any true mental understanding, absorption, and retention of such information. In this regard the teaching method and tachistoscope apparatus in accordance with the present invention are substantially unlike prior art learning exercises, including quizzes, which are substantially written on paper.

Furthermore, in its preferred embodiment for teaching reading, the present invention exhibits still other attributes than the forcing of the student-user's attention and learning (significant as that is). In particular, during the teaching of reading certain textual information is presented in a manner so that (i) irreversibly unidirectional reading only in a forward direction, (ii) reading at a forced pace and, most importantly, (iii) reading by multi-word word groups as opposed to by individual words, are facilitated. In particular, the present invention differs from even prior art reading machines in that words (or letters) are not individually sequentially exposed to view (for reading), but are instead momentarily exposed to view in successive word groups each consisting of two or more words. The "clippety-clop" presentation of successive word groups, and not the mere word rate speed of the presentation, mandates that the student-user must fixate and read multi-word word groups (including with full use of his/her peripheral vision) and cannot successfully read the presented text single word image by single word image.

Furthermore in its preferred embodiment for teaching spelling, the present invention again exhibits still other attributes than the forcing of the student-user's attention and learning (significant as that is). Particularly, during the teaching of spelling, the student-user's transliteration and motor skills in replicating by keystroking those words to be spelled is fully developed priorly that the student-user is later quizzed (by transitory word image presentations) to produce the correct spelling of such words. The student-user is effectively given a full rehearsal in developing all skills necessary for his/her response priorly to being forced, in accordance with the present invention, to use these skills in a true learning experience.

A correct response to the transitory word image presentations of a spelling quiz in accordance with the present invention will not be possible by superficial transposition of information, but will require the student-user's true mental understanding, absorption and retention of information. A student-user cannot copy that word that he/she can no longer see. A correct spelling cannot be rendered in response to the quiz save that the subject "know" the spelling. Moreover, having once "forced the channel open" in a student-user's mind for receipt (and response) of information regarding word spelling, the preferred embodiment of the present invention seizes the opportunity of student-user attentiveness to impart additional information regarding words, definitions. Later the student-user's assimilation of this information is also tested, although not by transitory, flashed, presentations.

The preferred embodiments of the present invention thusly demonstrate not only the flashed presentation of information for teaching purposes, but also demonstrate the distinct tailoring and adaptation of such presentations in combination with other teaching techniques in order to achieve optimal learning results. It is effectively impossible to successfully engage in any of the various instructional regimens in accordance with the present invention without paying close attention, and without actually learning the information presented if such is not already known. Conversely, close attention and diligent learning produces good results. Neither of these statements can invariably be made about prior art instructional methods, including by machine-based programmed learning.

The preferred embodiment computerized tachistoscope in accordance with the present invention is diagrammatically illustrated in its preferred operational environment within FIG. 1. The tachistoscope includes a computer 10, typically a personal computer, having an input/output device, typically disk drives 11, 12. The computer 10 connects to a monitor console 20 and a keyboard 30. The computer 10 is loaded with programs in accordance with the present invention that are typically on disks 40 (not visible, housed in disk drives 11, 12). When the programs are run then messages 21 will appear to the student-user 50 (not part of the present invention) on monitor 20, and the student-user 50 will respond to queries via keyboard 30.

Certain typical displays appearing on monitor 20 (shown in FIG. 1) during a first preferred embodiment of a method in accordance with the present invention for the teaching of reading are illustrated in FIGS. 2 through 16. These screens are exactly those which are generated by that first program that is contained within Appendix 1 to this specification. The program is written in the BASIC programming language, and operates under a BASIC compiler typically running on an IBM personal computer or compatible type. In particular, the program preferably operates under GW BASIC available from Microsoft Corporation. During initiation of the program prior to its execution upon computer 10 (shown in FIG. 1) the computer operating system, typically MS-DOS, is first loaded and then the GW-BASIC program is loaded. While operating within GW-BASIC the program within appendix 1 of this specification is caused to be loaded, and then it is run.

Upon the running of the preferred embodiment of the program for the flashed presentation of information for teaching reading, the initial screen appearing on monitor 20 (shown in FIG. 1) will be substantially as appears in FIG. 2. The copyright notice appearing therein is exemplary only, and is not intended to preclude full and free copying of FIG. 2 (and all remaining Figures) during replication of this patent specification. No rights in copyright are claimed within this patent specification, the copyright notice only appearing in order that the actual lead screen to the preferred embodiment program, called "Flash Reading 1" may be more authentically presented.

Continuing in the preferred embodiment program in accordance with the present invention for teaching reading, a second message screen for the "Flash Reading" program, called SCREEN: FR MESSAGES 2, appears in FIG. 3. Within FIG. 3 and following Figures certain sample information as may be entered by student-user 50 appears in bold face type, whereas information generated by operation of the program within the computerized tachistoscope system appears in normal type.

A typical interaction of the computerized instructional system with the student-user is visible in screen FR MESSAGES 3 shown in FIG. 4. The program has picked up the student-user's name previously entered during the presentation of screen FR MESSAGES 2 shown in FIG. 3, and is using this name in order to be more familiar and friendly with the student-user while querying his/her responses regarding further program progress. If the selected response to the query presented in screen FR MESSAGES 3 (shown in FIG. 4) where to be "2", as illustrated, then the screen FR MESSAGES 4 shown in FIG. 5 would next appear. The message contained therein is self-explanatory, and describes the preferred embodiment operation of the program wherein groups of words will be flashed upon the monitor screen.

A further operator entry with the program, which would have been directly entered from screen FR MESSAGES 3 (shown in FIG. 4) should a selection of "1" have been made in response to the question of that screen, is shown as screen FR MESSAGES 5 within FIG. 6. As indicated therein the student-user is able to make a numerical selection "0" through "5" for the speed at which greeting material will subsequently be presented. The speed selection "5" for "new reader" corresponds to a presentation speed of approximately 47 groups of three words each per minute, or a total speed of 141 words per minute. Speed selection "4" for "junior high student-user" corresponds to an approximate presentation speed of 158 words per minute, speed selection "3" for "high school student-user" corresponds to a presentation speed of approximately 185 words per minute, speed selection "2" for "university student-user" corresponds to a presentation speed of approximately 210 words per minute; speed selection "1" for "speed reader" corresponds to a presentation speed of approximately 300 words per minute; and speed selection "0" for "super fast speed reader" corresponds to a presentation speed of approximately 425 words per minute. These presentation speeds are controlled by the internal clock speed of the operating personal computer, which clock speed is typically 4.77 MHz. If the computer employs a faster, or slower, master clock then the speed of presentation will be correspondingly proportionately changed. The program, may of course, be readily modified by a competent programmer to establish any desired degree of rapidity or slowness in the presentation of reading materials.

Screen FR MESSAGES 6 shown in FIG. 7 is a small message screen whereat the student-user may pause prior to entering into the attempted reading of the text, which text will be presented by flashed presentation of successive word groups. Screen FR TEXT 1 through FR TEXT 3 appearing in FIG. 8-10 should be considered illustrative of the sequential, flashed, presentation of information to be read, as and when presented, by the student-user. It should be understood that each of the typical screen FR TEXT 1 through FR TEXT 3 will only be presented momentarily, and for a time duration, one screen and one word group to the next, which is in accordance with the speed selection made in response to screen FR MESSAGES 5 shown in FIG. 6. The monitor screen may be considered to be exhibiting a narrow but adjustable window that permits the student-user to view text by successive groups of words in the sequence as they appear in the text.

Obviously the partial line which is presented in FIGS. 8-10 reads, as a complete phrase, "When a 13 year old Virginia girl started sneezing, her parents...". This is but the beginning phrase, and beginning of the first line, of a short story that typically includes about three hundred (300) 3-word word groups. In fact, this line is from an article titled "Anatomy of a Sneeze" appearing in the Reader's Digest. The story is typical of the type of interesting material, substantially uniform in word difficulty, that is beneficially presented to student readers.

When this partial textual line is presented, in accordance with the preferred method of the present invention, the phrase is first broken into three successive groups of three words each. The word groups are then displayed in the sequential order illustrated in FIGS. 8-10. The word groups for each successive transitory presentation may be maintained a the same position upon the monitor screen or, as is preferable, may be moved across the screen from left to right as is the illustrated case in FIGS. 8-10. Likewise, each line may be presented at the same relative vertical position upon the monitor screen. Optionally, the presentation of word groups from subsequent lines may proceed from top to bottom equivalently as if actual lines were being read from a body of text. As soon as sufficient text has been displayed upon the monitor screen so as to constitute an entire page, then subsequent word group presentations, and reading, may resume at the upper left hand corner equivalently as if a page of actual text had been completely read by the scanning eye. The particular program of Appendix 1 does not employ this optimal presentation, but such presentation is readily implemented by one skilled in the art of computer programming.

Careful consideration should be given to the nature of teaching, and the concomitant effect on learning, of the staged "flashed" mode of presentation illustrated in FIGS. 8-10. Each group of words, typically 3 to 5 in number, is flashed upon the screen for a specific and consistent period of time, thereafter disappearing. There is only one group of words on the screen at any one time. The tachistoscopic effect of the program causes the student-user reader's eye to take in the entire group of words and to move across the screen, following the movement of the "window" to the text and not the individual words of the text. In this manner the computerized tachistoscope in accordance with the present invention is superior to a mechanical device which selectively occludes all but a portion, or moving window, of printed text because the window is not subject to progressively overlap individual words. Rather, the window "snaps", or "jumps", from one word group to the next, forcing that the eye should ultimately proceed likewise.

Especially at the more rapid reading speeds it is fundamentally impossible to follow the sequential, flashed, presentation of the tachistoscope in accordance with the present invention by reading a single word at a time. The student-user, or reader, develops effective use of his peripheral vision in reading, and is paced by the program. The reader comes to read entire groups of words, as opposed to individual words, and gradually increases the speed of his/her reading. As each individual student-user comes to master reading at any given speed level (and comprehends the reading, the testing of which will be hereinafter explained) then higher reading speed levels may selected. The highest reading speed levels are very challenging even to accomplished speed readers, who must sweep their eyes regularly and consistently in order to assimilate the text material at its enhanced rate of presentation.

In accordance with the present invention, the speed of flashed presentations of the successive word groups is not invariably and precisely constant, but optionally increases during certain intervals from the student-user-selected speed level. This optional speed variation, which is implemented by the particular software program attached as Appendix 1, is typically on the order of 10% over three-minute intervals during which interval many successive word groups are normally presented. For example, the program will run, and the tachistoscope presentations will proceed, for 3 minutes at the originally selected speed. Then the speed will increase very slowly until the speed has increased by ten percent. The more rapid speed will be maintained for 3 minutes and then the speed will be reduced to the original speed. This interval training will be repeated until the program has been read in its entirety. The magnitude of the speed variation about the preset speed is, in any case, recommended to be less than twenty-five percent (25%). The time interval durations of ramping the preset speed up and down, and the time interval durations of holding the speed at the same level are not as important as the occurrence of the slight speed variation itself. Mainly, the slight speed variation eliminates any stupefying effects of invariant periodicity, and prevents monotony. The slight speed variation aids the student-user in "bootstrapping" his/her performance to the next preset level. If the student-user's performance in either (i) reading speed or (ii) comprehension is marginal because of presentation rate sensitive difficulties (i.e., the words go by too fast) then the intervals of enhanced rate presentation help to identify this marginal performance. Conversely, if a particular student-user feels no strain nor incurs any comprehension impact in text sections presented at an enhanced rate, then that student-user is a good candidate to attempt reading of faster preset presentation rates.

Still further in accordance with the present invention, the latency time duration of flashed presentations of the successive word groups is not invariably and precisely constant, but increases during the presence of certain conditions from the base latency, which latency is itself dependent on a student-user-selected presentation speed level. This latency time duration variation, which is implemented by the particular software program attached as Appendix 1, is typically on the order of 50%.

In its preferred operational mode the computerized instructional system, or tachistoscope, projects a group of three words from a given text on the screen of a computer monitor. Each group of words remains on the screen for a brief period of time. The user selects the exposure time prior to reading the material on the screen.

The period of exposure is extended by a factor of 1.5 whenever the program encounters one of three characteristics of the words comprising the group. The characteristics of the word groups that may increase the exposure period of the groups are preferably threefold.

First, if the word group contains a period designating the end of a sentence, then the display latency time duration will be extended.

Second, if the word group contains greater than 26 characters then the display latency time will also be extended.

Third, if the word group contains a previously assigned vocabulary study word then the display latency time duration is extended.

If any of the three characteristics listed above is satisfied, the system will extend the display latency time duration by 1.5×(the selected user time). The computer will optionally generate an auditory alarm as well as highlight the study vocabulary word in the group.

As an example of timing considerations using a vocabulary study word, consider that the study vocabulary word is "the" and the flash speed is 100 milliseconds. For the following successive word groups, constituting a text, the display latency time duration will be as indicated:

| Word Group | Display Latency Time Duration |
|---|---|
| 1 Over the past | 100 × 1.5 = 150 milliseconds |
| 2 20 years, statistics | 100 milliseconds |
| 3 have shown lung | 100 milliseconds |
| 4 cancer death rates | 100 milliseconds |
| 5 have increased dramatically | 100 × 1.5 = 150 milliseconds |

-continued

| Word Group | Display Latency Time Duration |
|---|---|
| 6 in women; the | 100 × 1.5 = 150 milliseconds |
| 7 increase was over | 100 milliseconds |
| 8 300% in Canada | 100 milliseconds |
| 9 and the United | 100 × 1.5 = 150 milliseconds |
| 10 States alone. How | 100 × 1.5 = 150 milliseconds |
| 11 can this be | 100 milliseconds |

Word groups 1, 6 and 9 are held on the screen for 1.5 times the user selected time because the vocabulary study word "the" is found in the group. Because word group 5 contains 27 characters it will also remain on the screen for an extended time. Finally, word group 10 is also held on the screen for an extended time in response to the period at the end of the sentence.

As a still further aspect of the present invention certain words may be shown to the student-user in boldface type, or otherwise highlighted. In the sample word groups just shown, the emphasized word is again the word "the" The emphasis helps the student-user recognize, and learn, the vocabulary word.

Variations and the mode and manner of presentation are obviously possible. The number of words presented within each group need not be identical, but can be modified in consideration of individual word lengths and/or textual punctuation. Indeed, as explained in the background of the invention section to this specification, certain most accomplished readers read in large "chunks" or "clumps" of text, scanning for key words and for meaning without becoming bogged down in the individual words and syntax of each sentence. Although at the more exalted levels of reading prowess the method in accordance with the present invention may be of but little use for further improving already perfected reading techniques, the method of the present invention is very useful to acquainting beginning-, and intermediate-level readers with both the concepts that (i) the eye should not regress within the body of text being read, and (ii) the eye should attempt to take in more than one read word at each successive point of fixation. This is equivalent to saying that the eye should go forward only, and that the peripheral vision should be used during the course of reading.

A preferred conclusion to the preferred program method in accordance with the present invention for teaching reading is shown in FIGS. 11-16. Screen FR MESSAGES 7 shown in FIG. 11 introduces the test of reading comprehension. Sample questions within such tests are shown as screen FR QUESTIONS 1 and FR QUESTIONS 2 respectively within FIGS. 12 and 13. It may be noted that the order of questions, and the numbers thereof, are in substantial correspondence to the word groups previously sequentially flashed during the reading exercise. Of course, each word group may not give rise to a separate question. However, a skilled teacher is often able to assess student-user performance on the reading comprehension in order to determine whether the reading speed is too high, the student-user eye has become fatigued, defects in the field of vision exist, and/or systemic problems are affecting student-user reading performance.

A sample screen FR MESSAGES 8 shown in FIG. 14 would be presented to that student-user who exhibited perfect reading comprehension. Alternatively, the screen FR MESSAGES 9 and FR MESSAGES 10 respectively shown in FIGS. 15 and 16 would be presented to the student-user who exhibited a 90%, for example, level of reading comprehension. The general tone of the programmed presentation may be observed to be student user friendly, and to be directed to encouraging and fostering the learning experience.

The monitor screens typically presented by a second preferred programmed method in accordance with the present invention, which method is directed to the teaching of spelling, are shown in FIGS. 17-38. The method will again be characterized by the sequential, flashed, presentation of information. In this case, the information constitutes a spelling and vocabulary drill program. The listing of this program is attached to the present specification as Appendix 2. The program is written in the BASIC language, and must be executed under a basic compiler such as GW-BASIC typically operated in the IBM personal computer or equivalent.

As in the previous program directed to instruction in reading, a typical introductory screen for the spelling and vocabulary drill program is shown as screen FS MESSAGES 1 within FIG. 17. Again, the copyright notice is illustrative only, and does not preclude the copying of this drawing within reproduction of the present specification. Screen FS MESSAGES 2 for the obtaining of student-user data is shown in FIG. 18. Screen FS MESSAGES 3 shown in FIG. 19 allows the student-user, now addressed by his/her previously inserted name, to either commence testing or solicit more information. If more information is solicited, as is indicated, by example, by the entry of "2" in response to screen FS MESSAGES 3, then the explanation of the ensuing testing is presented to the student-user as screen FS MESSAGES 4 shown in FIG. 20.

A first and subsequent screen for the static presentations of words are shown as screens FS STATIC WORD 1 through FS STATIC WORD 3 in FIGS. 21-23. The screen FS STATIC WORD 1 is proceeded by another message screen, screen FS MESSAGES 5, to give the student-user some final, repetitive, instruction regarding the required nature of his response. Each word is presented upon the screen individually, for example the words "accept" and "already" in FIGS. 21, 22. Typically approximately ten spelling words are successively statically presented. The user is required to type the word as it is seen upon the screen. If the student-user is not able to type the word correctly then the screen repeats the word indefinitely until student-user is able to correctly keystroke the word.

Importantly to the preferred method in accordance with the present invention, the skill that is being practiced at this point is the necessary student-user hand-eye coordination required to type (spell) the word correctly. The learning process is taking place while the word and its correct, keystroked, spelling is being committed to memory. The user is developing a complete, interactive, response which indicates that, at least to some degree, the word image and its spelling are being appropriately assimilated. Each word must be typed correctly or the program will not move to the next new word. Only after the user demonstrates total competence in typing the (typically ten) words as they are seen on the screen will the program then move to the next, second, phase of instruction.

The nature of the next, second, phase of instruction is described in screen FS MESSAGES 6 shown in FIG. 23. Mainly, as is illustrated in screens 24-27, a previously-introduced (and correctly spelled) word will again be seen on the screen, but now only for a brief period. Particularly, screens FS FIRST FLASH WORD 1 and FS FIRST FLASH WORD 2 respectively shown in FIGS. 24 and 26 should be understood to appear but momentarily. The flashed presentation of the word to be spelled requires concentration on the part of the student-user since the student-user is now requested, once again, to type the word which has been seen upon the screen. Since the screen is essentially blank and no longer displays the word that is requested to be spelled at the time when the student-user is requested to enter the word, the student-user can only correctly spell the word by reliance upon his/her memory. The student-user must depend upon the very brief flash of the word and his/her recall from the first phase of the exercise in order to spell the word correctly. As in the first phase, if the word is not spelled correctly it will be flashed again and again as required until the student-user is able to enter the correct spelling. Even if the student-user has no recall from the first phase of the exercise, it will still be possible, ultimately, to learn the spelling of the word from its successively flashed presentations, howsoever brief. However, the student-user is normally encouraged to couple the entirety of neural and physical response as permits of his/her correct performance, and to both learn, and demonstrate, his/her command of spelling the word.

After each word is spelled correctly the programmed method in accordance with the present invention will write the definition of such word upon the screen. This may be observed as screen portions FS DEFINITION WORD 1 and FS DEFINITION WORD 2 respectively in FIGS. 25 and 27. After all (typically ten) flashed words have been written correctly, and after all definitions have been presented and (hopefully) studied, then the programmed method in accordance with the present invention will move to a third phase of instruction.

This third phase of instruction requires the student-use to reproduce by keystroking the same words, again individually flashed, for which the correct spelling has ostensibly been mastered. The directions preceding this third phase of testing are within screen FS MESSAGES 7 shown within FIG. 28. As indicated therein, within this third phase of training the student-user must reproduce ten individually flashed words that are presented in a random order. Moreover, individual words may be repeated. The manner of such presentation for a second flashed presentation of a first word (the word "beautiful") is shown as screens FS SECOND FLASHED WORD 1 and FS TEST SPELLING SECOND FLASHED WORD 1 respectively in FIGS. 29 and 30. The student-user must spell all ten of the momentarily flashed words correctly in order to move on to the final, fourth, phase of training. A sample screen appearing if the student-user has not totally mastered the spelling of those ten words flashed in presentation during test phase 3 is shown as screen FS MESSAGES 8 shown in FIG. 31. The student-user is allowed to selectively repeat earlier phases of the drill or the entire instruction, or to end a period of instruction. The screen FS MESSAGES 9 shown in FIG. 32 is presented if the student-user elects to retire from further instruction, as would be the case for the selection entry "3" shown in FIG. 31.

At such time as the student-user has spelled the presented words totally correctly in both test phase 2 and phase 3 the screen FS MESSAGES 10 shown in FIG. 33 would be presented. This screen indicates that the student-user is able to move onto a fourth phase of programmed training. During this phase of training the program writes a sentence upon the monitor screen that requires the student-user to fill in a missing word. The missing word will be one of the (typically 10) words that have previously been taught within the spelling exercise. The student-user must be both aware of the required word (from memory), must employ such word in accordance with its proper definition, and must spell the word correctly. Two sample screen occurring during this fourth phase vocabulary test are screen FS VOCABULARY TEST WORD 1 and FS VOCABULARY TEST WORD 2 respectively shown in FIGS. 34 and 35.

Conclusory screens to the sequence of testing, and particularly dealing with the fourth phase vocabulary test, are indicated as screens FS MESSAGES 11 through FS MESSAGES 13 respectively shown within FIGS. 36–38. The student-user, and his/her instructor, are presented with detailed performance information from which information both general performance statistics, and problems occurring with individual words and concepts, may be recognized.

Figure 39:
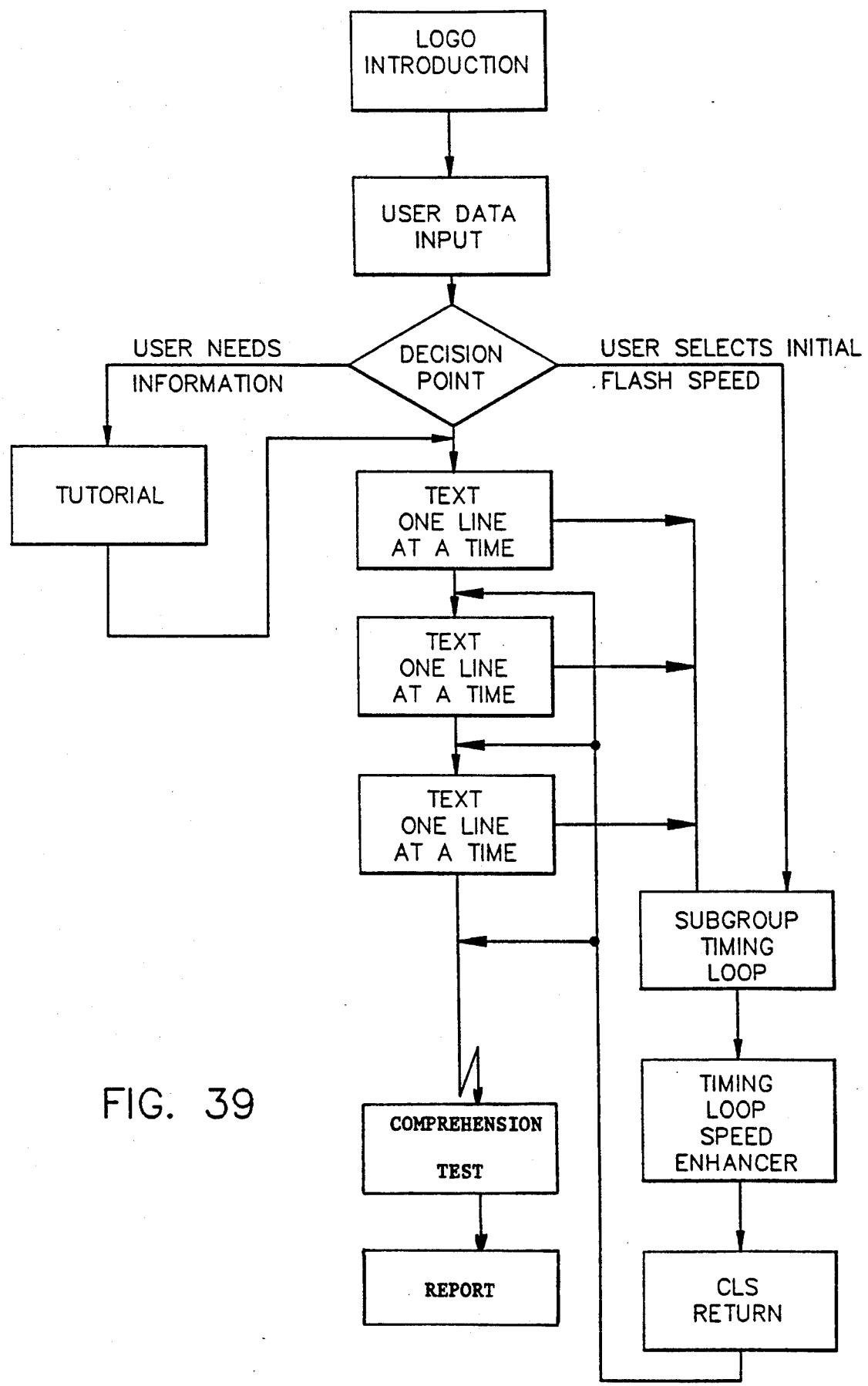
FIG. 39 shows a computer program flow chart of the preferred embodiment of a programmed method in accordance with the present invention for teaching reading.
Figure 40:
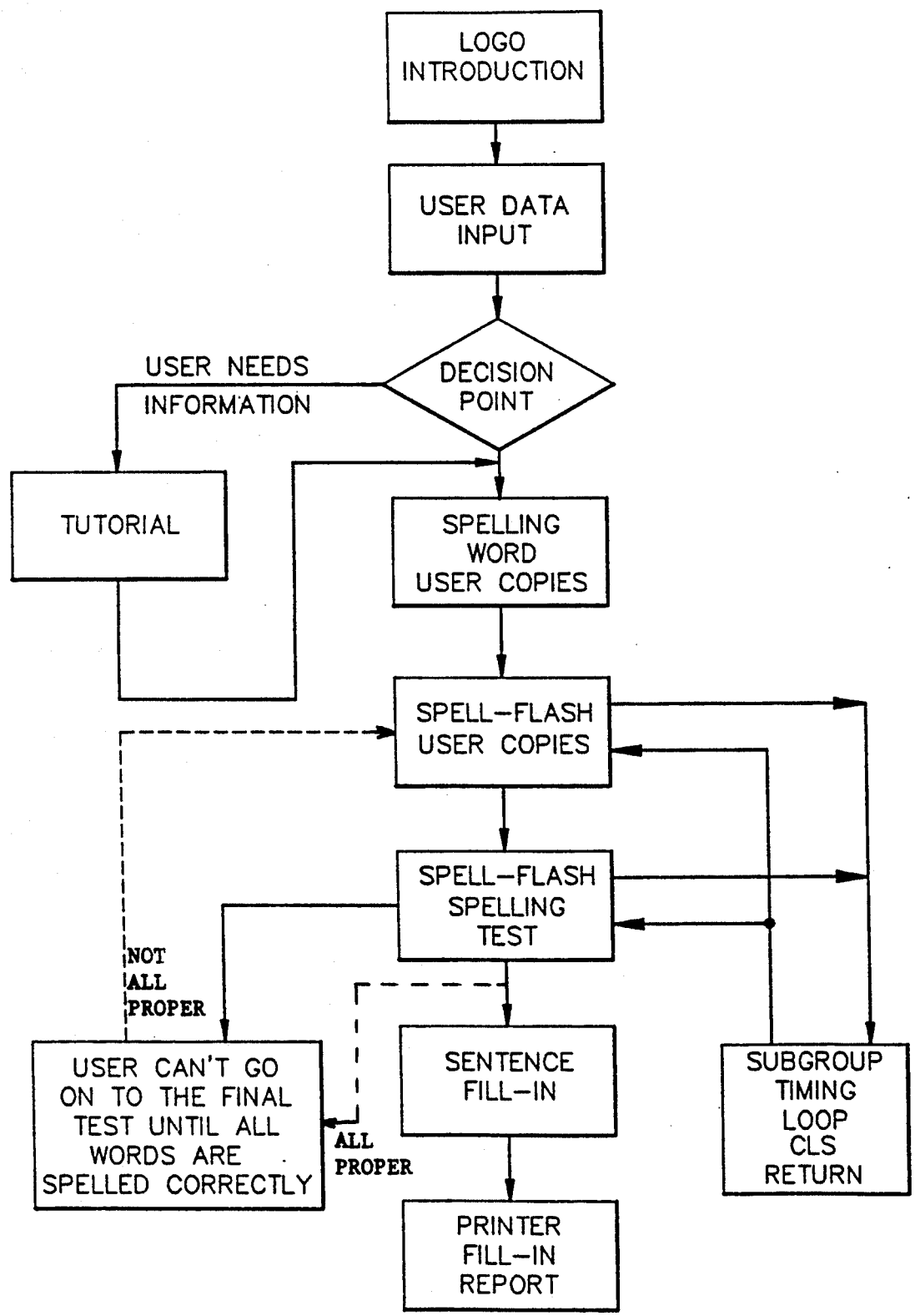
FIG. 40 shows a computer program flow chart of the preferred embodiment of a programmed method in accordance with the present invention for teaching spelling.

A computer program flow chart for the preferred embodiment method in accordance with the present invention for flashed presentation of reading materials is shown in FIGS. 39–40. A computer program flow chart for the preferred embodiment method in accordance with the present invention for the presentation (including at times flashed presentation) and test of spelling and vocabulary skills is shown in FIG. 40. Both flow charts may be observed to employ, at points therein, the flashed, momentary, presentation of information. Within both programs this flashed presentation is particularly enabled under a "subgroup timing loop" wherein, in accordance with a student-user preselected quantity, a delay is incurred. During the duration of this delay certain information will be presented to the student-user upon the monitor screen. At the expiration of this delay the previously presented information will be overwritten, thereby effectively causing that it has been "flashed" Certain of the presentations do not employ the timing loop, and are essentially static. The combination of static presentations, including messages and directives, with flashed presentation of information is characteristic of the instructional method in accordance with the present invention.

In accordance with the preceding discussion, certain variations and adaptations of the preferred methods, and of preferred computerized tachistoscope, in accordance with the present invention will suggest themselves to educators. It would, for example, be possible to adapt the flashed presentations in accordance with the present invention to the learning of mathematics; for example to the learning of the multiplication tables. For example, a message "8×8=64" could momentarily appear upon the screen followed by a deletion of the answer "64" The student-user would then have to fill in the required product "64" from his/her memory. As this simplistic parroting of the multiplication table is mastered, then it is possible to proceed to still further, temporarily remote, testing wherein the student-user will not have been recently presented with the required answer.

The method of the present invention is obviously adaptable to learning the spelling, and meaning, of words other than those of ones native language. The tachistoscope can be modified to present stimuli to an entire group, or class, in parallel as opposed to providing individualized instruction. Particularly for mass testing, the sequential presentation of words groups might be flashed upon a large screen. Student-user comprehension to this set rate of materials presentation could later be assessed by testing which (might be written on paper or otherwise). By such a staged, sequential, flashed presentation of information the reading comprehension of a student-user at a precise reading speed level may be more directly, and definitively, assessed than by alternative, prior art, tests of reading comprehension which allow a student-user access to a block of text material and which subsequently test the student-user's comprehension thereof In particular, the method and apparatus of the present invention will detect those student-users which have high reading speed but which improperly rely upon regression within the block of text read for their adequate comprehension and/or for their satisfactory performance on subsequent testing Finally, it will be recognized that the methods and preferred computer apparatus of the present invention expand the art of tachistoscopic learning beyond rigid and limited methods and machines, and even beyond the application of formal rules, no matter how modern or sophisticated. In particular, the methods and apparatus of the present invention are sensitive to the information (text) presented, and are therefore adaptive. Consider the logical extension of this concept: adaptive mimicry of superior readers and learners, and real-time, dynamic, analysis of an actual student-user's deviations from norms. For example a computerized tachistoscope with an input from a mechanism that tracks a human's moving eye, similar to such devices in fighter aircraft, could be programmed to learn the spatial and temporal reading patterns of one, or several, readers having superior speed and comprehension The same computerized tachistoscope with the same input mechanism could then analyze, in real time, the instantaneous and cumulative deviations in the reading patterns of a student user from the desired, or model, patterns Resultant to the analysis the student-user could be alerted to his/her faults, including by selective stimuli presented in real time concurrent with the ongoing instruction, and the tachistoscopic instructional curriculum might even be tailored, or customized, to the analyzed problems of a particular user.

Because reading and learning are fundamental, because no generation of humans is born literate and educated, and because the education of each successive generation of humans to the high requirements of the sophisticated modern world is increasingly costly, it is obvious that machines must become more capable and flexible in their ability to educate humans as well as to support those humans who are, by and large, already educated. The tachistoscopic apparatus and methods of the present invention are believed to make progress towards this goal.

In accordance with these and other obvious modifications and adaptations of the present invention, the scope of the present invention should be determined by the following claims, only, and not solely in accordance with that preferred computerized tachistoscope apparatus, and those two preferred programmed methods, within which the present invention has been taught.

APPENDIX 1

```
5 REM' THIS IS THE MENU.BAS PROGRAM XXXXXXXXXXXXXXXXXXXXXXXXXXXXXXXXXXXXXX
10 CLS:KEY OFF:COLOR 0,4:GOSUB 340:GOSUB 9500:COLOR 7,0:GOSUB 340
11 REM' to change the right answer threshold enter number belowXXXXXXXXXXXXX
12 THRESH=80
13 REM' TO SET THE PASSWORD FOR THE TEACHERS FILE BUT WORD IN BELOWXXXXXXXXXX
14 PASSWORD$="144"
15 ON ERROR GOTO 500
16 REM' TO CHANGE THIS TO A VOCABULARY SIGHT PROGRAM ENTER Y BELOW XXXXXXXXXXX
17 LOCATE 10,14:PRINT "DO YOU WANT TO USE THE RATE BUILDER PLUS PROGRAM Y/N":WD=
1:Q$=INPUT$(1):LOCATE 10,14:PRINT STRING$(54," ")
18 IF Q$="Y" OR Q$="y" THEN VOCAB$="Y" ELSE VOCAB$="N"
20 COMPANY$="PVA SYSTEMS"
25 REM' HOW MANY READING UNITS ARE ON THIS DISK ????XXXXXXXXXXXXXXXXXXXXXXXX
26 GROUP$="5"
30 LL=LEN(COMPANY$):LL1=(LL/2):LOCATE 4,(40-LL1):PRINT;COMPANY$
40 COLLECTION$="READERS DIGEST, NOV. 1989"
41 REM' IF THIS IS A VOCABULARY PLUS PROGRAM ADD PLUS TO THE NAMEXXXXXXXXXXXX
42 IF VOCAB$="Y" THEN GOTO 43 ELSE 50
43 COLLECTION$="READERS DIGEST PLUS, NOV. 1989"
50 LL=LEN(COLLECTION$):LL1=(LL/2)
60 LOCATE 6,(40-LL1):PRINT COLLECTION$
70 LOCATE 7,11:PRINT STRING$(60,CHR$(205))
80 LOCATE 8,17:PRINT "Type your initials, then strike the enter key.."
90 LOCATE 9,19:PRINT "Use a space if you have no middle initial."
100 LOCATE 10,37:PRINT CHR$(218)STRING$(3,CHR$(196))CHR$(191)
110 LOCATE 11,37:PRINT CHR$(179):LOCATE 11,41:PRINT CHR$(179)
120 LOCATE 12,37:PRINT CHR$(192)STRING$(3,CHR$(196))CHR$(217)
130 LOCATE 11,38:LINE INPUT;INITIALS$
140 LL=LEN(INITIALS$)
150 IF LL<3 THEN BEEP:LOCATE 13,26:PRINT "You did not include a space !" ELSE 17
0
160 LOCATE 11,38:PRINT "   ":GOTO 130
170 LOCATE 13,23:PRINT "    Are the initials correct Y/N    ":Q$=INPUT$(1)
180 IF Q$="Y" OR Q$="y" THEN GOTO 185 ELSE GOTO 190
185 IF INITIALS$="FILE" OR INITIALS$="file" THEN GOTO 6500 ELSE GOTO 201
190 LOCATE 11,38:PRINT "   "
200 LOCATE 13,23:PRINT "                              ":GOTO 130
201 EXT$="rcd":FILE$=INITIALS$+CHR$(46)+EXT$
202 OPEN FILE$ FOR INPUT AS #1
203 WHILE NOT EOF(1)
204 INPUT #1,A$
205 INPUT #1,F
206 WEND
207 CLOSE:FIL9$=FILE$
209 REM' THIS IS A PVA LIBRARY DISK DATE NOT NEEDED XXXXXXXXXXXXXXXXXXXXXXXX
210 GOTO 311:FOR Z=1 TO 7:X=X+1:LOCATE (X+7),11:PRINT STRING$(60," "):NEXT
220 LOCATE 8,18:PRINT "Type today's date, using all numbers and in the"
230 LOCATE 9,28:PRINT "example form 10/31/1989."
240 LOCATE 10,35:PRINT CHR$(218)STRING$(10,CHR$(196))CHR$(191)
250 LOCATE 11,35:PRINT CHR$(179):LOCATE 11,46:PRINT CHR$(179)
260 LOCATE 12,35:PRINT CHR$(192)STRING$(10,CHR$(196))CHR$(217)
270 LOCATE 11,36:LINE INPUT;DAT$
280 LOCATE 13,28:PRINT "Is the date correct Y/N":Q$=INPUT$(1)
290 IF Q$="Y" OR Q$="y" THEN GOTO 311 ELSE GOTO 300
300 LOCATE 11,36:PRINT "          "
310 LOCATE 13,28:PRINT "                       ":GOTO 270
311 F=F+1:F$=STR$(F)
```

```
312 EXT$="rcd":FILE$=INITIALS$+CHR$(46)+EXT$
313 OPEN FILE$ FOR OUTPUT AS #1
314 WRITE #1,DAT$
315 WRITE #1,F
316 CLOSE
320 CLS:GOTO 1000
330 STOP
340 REM' large box%%%%%%%%%%%%%%%%%%%%%%%%%%%%%%
350 LOCATE 5,10:PRINT CHR$(201)STRING$(60,CHR$(205))CHR$(187)
360 Z=Z+1:FOR Z=1 TO 10:LOCATE (5+Z),10:PRINT CHR$(186):LOCATE (5+Z),71:PRINT CHR$(186):NEXT
370 LOCATE 16,10:PRINT CHR$(200)STRING$(60,CHR$(205))CHR$(188)
380 RETURN
500 COLOR 31,0:LOCATE 16,31:PRINT "THIS IS A NEW FILE":COLOR 7,0
510 LOCATE 19,26:PRINT "Strike Any Key to Continue."
520 @$=INPUT$(1)
530 LOCATE 16,31:PRINT STRING$(40," ")
540 LOCATE 19,26:PRINT STRING$(40," ")
550 GOTO 210
721 Z=Z+1:FOR Z=1 TO 15:LOCATE (4+Z),2:PRINT STRING$(79," "):NEXT
1000 CLS
1010 OPEN FILE$ FOR INPUT AS #1
1020 WHILE NOT EOF(1)
1030 INPUT #1,A$
1040 INPUT #1,F$
1050 WEND
1055 CLOSE
1070 'FLASH READ Linear Reading Training Program
1080 'Copyright (C) 1988 Peripheral Visual Acuity Systems
1090 REM'THE FILE NUMBER IS ??????????????????????????????????????????
1095 ON ERROR GOTO 5000
1096 COLOR 31,0:LOCATE 10,32:PRINT "ONE MOMENT PLEASE":COLOR 7,0
1100 EXT$="DAT":ST$="STORY"
1110 FILE1$=ST$+F$+CHR$(46)+EXT$
1115 IF VOCAB$="Y" THEN GOSUB 9200
1120 CHAIN MERGE FILE1$, 1130,ALL
1130 DIM CRLINE$(7),HINT$(2),FKEY$(10)
1140 DIM PROMPT$(2),SROW(2),SCOL(2),MAXLEN(2)
1145 IF VOCAB$="Y" THEN GOSUB 8200
1150 REM timer loop for constant
1160 TMULT = 2500:START = TIMER:FOR I=1 TO TMULT:NEXT I
1170 ELAPT=TIMER-START:CYCTIM=ELAPT/TMULT:TMULT=1!/(12.5*CYCTIM)
1180 REM end timer loop for TMULT constant
1190 DIM LOCHAR(2),HICHAR(2),OMIT$(2),ALLOW$(2)
1200 DIM SPEC$(2),LOVAL(2),HIVAL(2),LO$(2),HI$(2)
1210 REM' if this is an Encyclopedia Brown story enter yes below
1220 CODE$="NO"
1230 '%%%%%% Modify lines 100-999 to customize for new volumes %%%%%%%%
1240 'Set volume title below:
1250 VOLUME$="                    FlashRead "'Volume name for top line
1260 'Edit the 7 title screen lines below:
1270 CRLINE$(1)="                                              "
1280 CRLINE$(2)="                                              "
1290 CRLINE$(3)="                yyyyyyyyyy                    "
1300 CRLINE$(4)="                                              "
1310 CRLINE$(5)="                                              "
1320 CRLINE$(6)="                                              "
1330 CRLINE$(7)="                                              "
1340 '%%%%%%%%%%%%%%%%%%%%%%%%%%%%%%%%%%%%%%%%%%%%%%%%%%%%%%%%%%%%%%%%%%
```

```
1350 'Initialize data for input control
1360 PROMPT$(1)="Your Reading Index: ":SROW(1)=15:SCOL(1)=27:MAXLEN(1)=3
1370 LOCHAR(1)=48:HICHAR(1)=57:OMIT$(1)="":ALLOW$(1)=".":SPEC$(1)="0.0"
1380 LOVAL(1)=1:HIVAL(1)=5:LO$(1)="1.0":HI$(1)="5.0"
1390 PROMPT$(2)="Starting frame number: ":SROW(2)=17:SCOL(2)=27:MAXLEN(2)=3
1400 LOCHAR(2)=48:HICHAR(2)=57:OMIT$(2)="":ALLOW$(2)="":SPEC$(2)="1"
1410 LOVAL(2)=1:HIVAL(2)=999:LO$(2)="1":HI$(2)="999"
1420 HINT$(1)="Enter your Reading Index from 1.0 (fast) to 5.0 (slower). "
1430 HINT$(2)="Enter the frame number at which you wish to begin reading."
1440 'Assign key codes to variables
1450 CR$=CHR$(13):ESC$=CHR$(27):UA$=CHR$(0)+CHR$(72):DA$=CHR$(0)+CHR$(80)
1460 BS$=CHR$(8):FOR N=1 TO 10:FKEY$(N)=CHR$(0)+CHR$(58+N):NEXT
1470 'Miscellaneous assignments
1480 FALSE=0:TRUE=NOT FALSE
1490 'go count the frames in this story
1500 GOSUB 3380:HIVAL(2)=MAX:HI$(2)=MID$(STR$(MAX),2)
1505 IF VOCAB$="Y" THEN GOSUB 340:GOSUB 9110
1510 'Set up screen and then display title screen
1520 KEY OFF:SCREEN 0:FOR X=1 TO 10:KEY X,"":NEXT:KY$="":KY=0:CLS
1530 TOPLINE$="                             "+SPACE$(40-LEN(VOLUME$))+VOLU
ME$+" "
1540 GOSUB 3280'display top line
1550 STARTROW=6:STARTCOL=15:ROWS=13:COLS=50:LABEL$="":GOSUB 3120'draw box
1560 FOR N=1 TO 7:LOCATE STARTROW+N,STARTCOL+1:PRINT CRLINE$(N);:NEXT
1570 'Display input fields
1571 LL=LEN(COLLECTION$):LL1=(LL/2):LOCATE 8,(40-LL1):PRINT COLLECTION$:LOCATE 1
0,38:PRINT F
1575 IF SKIP < 1 THEN GOTO 1580
1576 T2=TIMER:SPD=((T2-T1)/60):WDS=((FRMCT*3)/SPD):WDS$=STR$(WDS):WPM$=LEFT$(WDS
$,4)
1577 COLOR 5,0:LOCATE 12,20:PRINT "You read at a speed of "     "  words per mi
nute."
1578 COLOR 31,0:LOCATE 12,42:PRINT WPM$:COLOR 7,0
1580 ON ERROR GOTO 0
1590 FOR N=1 TO 2:LOCATE SROW(N),SCOL(N):PRINT PROMPT$(N)SPEC$(N);:NEXT
1600 GOSUB 3240:GOSUB 3260'display Esc and Fkeys
1610 'Input data for getting index and start frame
1620 GOSUB 3090:CURFLD=1:CHRCNT=0:MAXFLDS=2:KY$="":DONE=FALSE
1630 LOCATE 23,12:PRINT HINT$(1);
1640 WHILE NOT DONE:LOCATE SROW(CURFLD),SCOL(CURFLD)+LEN(PROMPT$(CURFLD))+CHRCNT
,1:GOSUB 3050
1650 IF CHRCNT>=MAXLEN(CURFLD) OR (KY$<CHR$(LOCHAR(CURFLD)) OR KY$>CHR$(HICHAR(C
URFLD)) OR INSTR(OMIT$(CURFLD),KY$)) AND INSTR(ALLOW$(CURFLD),KY$) =0 THEN 1680
1660 IF CHRCNT=0 THEN SPEC$(CURFLD)="":ROW=SROW(CURFLD):COL=SCOL(CURFLD)+LEN(PRO
MPT$(CURFLD)):LOCATE ROW,COL,0:PRINT SPACE$(MAXLEN(CURFLD));:LOCATE ROW,COL,1
1670 SPEC$(CURFLD)=SPEC$(CURFLD)+KY$:PRINT KY$;:CHRCNT=CHRCNT+1:GOTO 1750
1680 IF KY$<>CR$ AND KY$<>DA$ OR LEN(SPEC$(CURFLD))=0 THEN 1730
1690 V=VAL(SPEC$(CURFLD)):IF V<LOVAL(CURFLD) THEN SPEC$(CURFLD)=LO$(CURFLD):LOCA
TE SROW(CURFLD),SCOL(CURFLD)+LEN(PROMPT$(CURFLD)):PRINT SPEC$(CURFLD);:BEEP:CHRC
NT=0:GOTO 1750
1700 IF V>HIVAL(CURFLD) THEN SPEC$(CURFLD)=HI$(CURFLD):LOCATE SROW(CURFLD),SCOL(
CURFLD)+LEN(PROMPT$(CURFLD)):PRINT SPEC$(CURFLD);:BEEP:CHRCNT=0:GOTO 1750
1710 CHRCNT=0:IF CURFLD<MAXFLDS THEN CURFLD=CURFLD+1 ELSE CURFLD=1
1720 LOCATE 23,12:PRINT HINT$(CURFLD);:GOTO 1750
1730 IF KY$<>BS$ THEN 1740 ELSE IF CHRCNT THEN CHRCNT=CHRCNT-1:PRINT CHR$(29)" "
CHR$(29);:SPEC$(CURFLD)=LEFT$(SPEC$(CURFLD),LEN(SPEC$(CURFLD))-1):GOTO 1750
1740 IF NOT DONE THEN BEEP
1750 WEND:LOCATE ,,0:IF KY$=ESC$ THEN 2040
1760 'Do calculations based on input
1770 T%  = 0
```

```
1780 FRAME=VAL(SPEC$(2)):IF FRAME>1 THEN GOSUB 3350'get to start frame
1790 E=0
1800 K=1
1810 INDEX=VAL(SPEC$(1))
1820 'Loop through volume read
1825 T1=TIMER
1826 SKIP=SKIP+1
1827 FRMCT=0
1830 CLS
1840 X = INDEX^2 * TMULT:TZ=0
1850 ON ERROR GOTO 1910
1860 GOTO 3420
1870 GOSUB 2050
1880 'Done reading this section
1890 RESUME 1900
1900 GOSUB 3240'display top line
1910 STARTROW=6:STARTCOL=15:ROWS=13:COLS=50:LABEL$="":GOSUB 3120'draw box
1920 FOR N=1 TO 7:LOCATE STARTROW+N,STARTCOL+1:PRINT CRLINE$(N);:NEXT
1930 COLOR 5,0:T3=TIMER:LOCATE STARTROW+9,STARTCOL+5:PRINT "You have completed this reading exercise.";
1931 COLOR 7,0:LL=LEN(COLLECTION$):LL1=(LL/2):LOCATE 8,(40-LL1):PRINT COLLECTION$:LOCATE 10,39:PRINT F:COLOR 5,0
1932 COLOR 7,0:LL=LEN(COMPANY$):LL1=(LL/2):LOCATE 5,(40-LL1):PRINT COMPANY$
1935 SPD=((T3-T1)/60):WDS=((FRMCT*3)/SPD):WDS$=STR$(WDS):WPM$=LEFT$(WDS$,4)
1936 LOCATE 12,20:PRINT "You read at a speed of "     " words per minute."
1937 COLOR 31,0:LOCATE 12,42:PRINT WPM$:COLOR 5,0
1940 LOCATE 16,18:PRINT "         Would you like to take a quiz":COLOR 7,0
1950 LOCATE 18,19:PRINT "                       Y/N":Q$=INPUT$(1)
1960 IF Q$="Y" OR Q$="y" THEN GOTO 2150
1961 IF Q$="N" OR Q$="n" THEN GOTO 2010
1962 BEEP:COLOR 31,0:LOCATE 22,25:PRINT "YOU MUST STRIKE THE Y OR N KEY":COLOR 7,0:GOTO 1950
1970 LOCATE 16,18:PRINT "                                   "
1980 LOCATE 18,19:PRINT "                                   "
1990 GOSUB 3240:GOSUB 3020:GOSUB 3050'Esc, press any key, get a key
2000 IF KY$=ESC$ THEN 2040
2010 GOTO 2040
2020 LOCATE STARTROW+9,STARTCOL+5:PRINT SPACE$(41);
2030 RESTORE:SPEC$(2)="1":GOTO 1570'go back to title and input screen
2040 COLOR 7,0:CLS:LOCATE 23,1:CLOSE:EN=1:GOTO 8000
2050 'Time delay for flash read
2060 IF FRAME < 100 THEN GOTO 2100
2070 IF FRAME > 100 AND FRAME < 200 THEN TZ = TZ + INDEX
2080 IF FRAME > 300 THEN TZ = 0
2090 TTZ = TZ \ 10
2100 X = (TMULT * INDEX^2) - TTZ
2104 WDA=1
2105 IF LL2 > 22 THEN WD=2:GOTO 2110
2110 FOR QQ = 1 TO (((X*WD)*WDA)*PERIOD)
2111 WD=1
2120 NEXT
2130 'PRINT "FRAME= ";FRAME;" TZ= ";TZ;" X= ";X;" INDEX= ";INDEX
2140 RETURN
2150 REM' this is the beginning of the quiz
2155 CLOSE
2160 Z=0:CLS:WRONG=0:NUM=0:GOSUB 2850:LOCATE 9,13:PRINT "ANSWER EACH OF THE QUESTIONS IN THE TOP OF THE SCREEN "
2165 LL=LEN(COMPANY$):LL1=(LL/2):LOCATE 4,(40-LL1):PRINT COMPANY$
2170 LOCATE 10,19:PRINT "BY STRIKING THE LETTER OF THE RIGHT ANSWER."
```

```
2180 LOCATE 18,27:PRINT "Strike any key to continue"
2190 Q$="QUEST":EXT$="BAS"
2200 FILE4$=Q$+F$+CHR$(46)+EXT$
2210 Q$=INPUT$(1):CLS:GOSUB 3580
2220 OPEN FILE4$ FOR INPUT AS #1
2230 WHILE NOT EOF(1)
2240 NUM=NUM+1:LINE INPUT #1,Q1$
2250 LINE INPUT #1,Q2$
2260 LINE INPUT #1,Q3$
2270 LINE INPUT #1,Q4$
2280 LINE INPUT #1,CHOICE1$
2290 LINE INPUT #1,CHOICE2$
2300 LINE INPUT #1,CHOICE3$
2310 LINE INPUT #1,CHOICE4$
2320 LINE INPUT #1,A1$
2330 LINE INPUT #1,A2$
2340 L1=(LEN(Q1$)/2)
2350 L2=(LEN(Q2$)/2)
2360 L3=(LEN(Q3$)/2)
2370 L4=(LEN(Q4$)/2)
2380 LOCATE 1,40:PRINT NUM
2390 LOCATE 3,(41-L1):PRINT Q1$
2400 LOCATE 4,(41-L2):PRINT Q2$
2410 LOCATE 5,(41-L3):PRINT Q3$
2420 LOCATE 6,(41-L4):PRINT Q4$
2430 LOCATE 10,5:PRINT "A- ";CHOICE1$
2440 LOCATE 12,5:PRINT "B- ";CHOICE2$
2450 LOCATE 14,5:PRINT "C- ";CHOICE3$
2460 LOCATE 16,5:PRINT "D- ";CHOICE4$
2470 LOCATE 22,26:PRINT "Press the letter of the right answer."
2480 Q$=INPUT$(1):LOCATE 22,26:PRINT "                                     "
2490 GOSUB 3630:IF Q$=A1$ OR Q$=A2$ THEN GOTO 2510
2500 BEEP:WRONG=WRONG+1
2510 WEND
2520 CLOSE
2525 T2=TIMER
2526 GOSUB 6000
2530 CLS:GOSUB 2850
2540 LOCATE 18,25:PRINT "                                     "
2550 LOCATE 3,40:PRINT "   "
2560 IF WRONG=1 THEN LOCATE 8,22:PRINT "You missed one question, that's not bad.":GOTO 2590
2570 IF WRONG>1 THEN LOCATE 8,27:PRINT "You missed "WRONG" questions.":GOTO 2590
2580 IF WRONG=0 THEN LOCATE 8,15:PRINT "YOU ANSWERED ALL THE QUESTIONS CORRECTLY, WELL DONE.":GOTO 2590
2590 PERC=((WRONG*100)/NUM):PERC1=(100-FIX(PERC))
2600 LOCATE 12,18:PRINT "There were "NUM" questions asked and you answered"
2610 LOCATE 13,29:PRINT PERC1" percent correctly."
2620 LOCATE 20,23:PRINT "To Leave The Program Strike Any Key":Q$=INPUT$(1)
2625 IF PERC1< THRESH THEN GOSUB 8000
2630 IF CODE$="YES" OR CODE$="yes" THEN GOTO 2650
2640 IF CODE$="NO" OR CODE$="no" THEN GOTO 2840
2650 IF WRONG>0 THEN GOTO 2660 ELSE 2680
2660 GOSUB 2900:LOCATE 8,14:PRINT "Sorry, you must answer all of the questions correctly"
2670 LOCATE 9,17:PRINT "before you can see the answer to the mystery.":GOTO 2840
2680 GOSUB 2900:LOCATE 9,16:PRINT "Are you ready to read the solution to the crime?"
2690 LOCATE 10,23:PRINT "Strike any key to see the solution."
```

```
2700 Q$=INPUT$(1):CLS:Z=0:Z1=0:
2710 OPEN "soln1.bas"FOR INPUT AS #1
2720 WHILE NOT EOF(1)
2730 LOCATE 3,17:PRINT CHR$(201)STRING$(43,CHR$(205))CHR$(187)
2740 Z1=Z1+1:FOR Z1=1 TO 14:LOCATE (3+Z1),17:PRINT CHR$(186):LOCATE (3+Z1),61:PR
INT CHR$(186):NEXT
2750 LOCATE 18,17:PRINT CHR$(200)STRING$(43,CHR$(205))CHR$(188)
2760 LINE INPUT #1,SOL1$
2770 Z=Z+1:LOCATE (4+Z),20:PRINT SOL1$
2780 IF Z=11 THEN GOTO 2790 ELSE 2810
2790 LOCATE 20,27:PRINT "To Continue Strike Any Key"
2800 Q$=INPUT$(1):CLS:Z=0:Z1=0:GOTO 2720
2810 LOCATE 20,27:PRINT "To Continue Strike Any Key"
2820 WEND
2830 CLOSE
2835 DELETE 12500-
2840 CLS:EN=1:GOTO 8115
2850 REM"to draw the large box
2860 LOCATE 5,5:PRINT CHR$(201)STRING$(70,CHR$(205))CHR$(187)
2870 Z=Z+1:FOR Z=1 TO 10:LOCATE (5+Z),5:PRINT CHR$(186):LOCATE (5+Z),76:PRINT CH
R$(186):NEXT
2880 LOCATE 15,5:PRINT CHR$(200)STRING$(70,CHR$(205))CHR$(188)
2890 RETURN
2900 REM' to erase the questions line 6 to 14 (col.6 to 69)
2910 LOCATE 6,6:PRINT STRING$(68," ")
2920 LOCATE 7,6:PRINT STRING$(68," ")
2930 LOCATE 8,6:PRINT STRING$(68," ")
2940 LOCATE 9,6:PRINT STRING$(68," ")
2950 LOCATE 10,6:PRINT STRING$(68," ")
2960 LOCATE 11,6:PRINT STRING$(68," ")
2970 LOCATE 12,6:PRINT STRING$(68," ")
2980 LOCATE 13,6:PRINT STRING$(68," ")
2990 LOCATE 14,6:PRINT STRING$(68," ")
3000 RETURN
3010 STOP
3020 'Press any key
3030 COLOR 7,0:LOCATE 23,1,0:PRINT SPACE$(78);
3040 LOCATE 23,25,1:PRINT "Press any key to continue...";:RETURN
3050 'Get a keypress
3060 KY$="":KY=0:WHILE KY$="":KY$=INKEY$:WEND:KY=ASC(KY$):IF (KY<123) AND KY>96
THEN KY=KY-32:KY$=CHR$(KY)
3070 IF KY$=ES C$ OR KY$=CHR$(32) THEN DONE = TRUE
3080 RETURN
3090 'Clear keyboard buffer
3100 WHILE INKEY$<>"":WEND:RETURN
3110 RETURN
3120 ' Draw a box
3130 LOCATE STARTROW,STARTCOL:PRINT CHR$(201);:COLOR 0,7:PRINT LABEL$;:COLOR 7,0
:X2=COLS-LEN(LABEL$):FOR X=1 TO X2:PRINT CHR$(205);:NEXT:PRINT CHR$(187)
3140 FOR X=1 TO ROWS:LOCATE STARTROW+X,STARTCOL:PRINT CHR$(186);:LOCATE STARTROW
+X,STARTCOL+COLS+1:PRINT CHR$(186);:NEXT
3150 X2=STARTROW+ROWS+1:LOCATE X2,STARTCOL:PRINT CHR$(200);:FOR X=1 TO COLS:LOCA
TE X2,STARTCOL+X:PRINT CHR$(205);:NEXT:PRINT CHR$(188)
3160 RETURN
3170 'Display menu instructions line
3180 LOCATE 23,1,0:COLOR 7,0
3190 PRINT SPACE$(16)"Use ";:COLOR 15,0:PRINT CHR$(25)CHR$(24);:COLOR 7,0
3200 PRINT " to hilite your selection, then press ";:COLOR 15,0
3210 PRINT CHR$(17)CHR$(196)CHR$(217);
```

```
3220 COLOR 7,0:PRINT SPACE$(16);
3230 RETURN
3240 'Display Esc=menu
3250 LOCATE 25,1,0:COLOR 0,7:PRINT "Esc";:COLOR 7,0:PRINT " Menu";:RETURN
3260 'Display SPACE=start
3270 LOCATE 25,68,0:COLOR 0,7:PRINT "SPACE";:COLOR 7,0:PRINT " Start";:RETURN
3280 'Display top line
3290 COLOR 0,7:LOCATE 1,1:PRINT TOPLINE$;:COLOR 7,0
3295 COLOR 0,7:LOCATE 1,3:PRINT COMPANY$:COLOR 7,0
3300 RETURN
3310 'Clear a box from the screen
3320 FOR N=STARTROW TO STARTROW+ROWS+2
3330 LOCATE N,STARTCOL,0:PRINT SPACE$((COLS+2));:NEXT
3340 RETURN
3350 'Provide entry at any frame
3360 RESTORE:FOR X = 1 TO FRAME:READ A1$:NEXT
3365 LET Z=X
3370 RETURN
3380 'count frames to set limit for start frame s
3390 RESTORE:ON ERROR GOTO 3410:FOR MAX = 0 TO 999:READ A1$:NEXT
3400 RESTORE:RETURN
3410 RESUME 3400
3420 'Logic to display data at various horizontal positions
3430 LOCATE 11,1
3440 PRINT SPACE$(79)
3450 READ A1$
3451 FRMCT=FRMCT+1
3452 I2=INSTR(A1$,". ")
3453 IF I2 > 0 THEN PERIOD=1.5 ELSE PERIOD =1
3455 LL2=LEN(A1$)
3456 IF VOCAB$="Y" THEN GOSUB 8400
3460 IF K = 1 THEN PP = 1 : GOTO 3500
3470 IF K = 2 THEN PP = 25 : GOTO 3500
3480 IF K = 3 THEN PP = 60 - LEN(A1$) : GOTO 3500
3490 IF K = 4 THEN PP = 79 - LEN(A1$)
3500 LOCATE 11,PP
3510 LOCATE 11,PP:PRINT A1$
3511 IF VOCAB$="N" THEN GOTO 3520
3517 IF I>0 THEN GOTO 3518 ELSE 3520
3518 COLOR 0,7:I=I-1:LOCATE 11,(PP+I):PRINT WDA$:COLOR 7,0
3520 GOSUB 2050
3521 IF VOCAB$="N" THEN GOTO 3530
3525 LOCATE 12,(PP+I):PRINT STRING$(LL," ")
3530 KY$=INKEY$:IF KY$<>"" THEN RESTORE:SPEC$(2)=MID$(STR$(FRAME),2):GOTO 1510
3540 K = K + 1
3550 IF K > 4 THEN K = 1
3560 FRAME = FRAME + 1
3570 GOTO 3430
3580 REM' large box for the questionsIIIIIIIIIIIIIIIIIIIIIIIIIIIIIIIIIIIIIIIIII
3590 COLOR 5,0:LOCATE 1,1:PRINT CHR$(201)STRING$(78,CHR$(205))CHR$(187)
3600 Z=Z+1:FOR Z=1 TO 19:LOCATE (1+Z),1:PRINT CHR$(186):LOCATE (1+Z),80:PRINT CH
R$(186):NEXT
3610 LOCATE 20,1:PRINT CHR$(200)STRING$(78,CHR$(205))CHR$(188):LOCATE 7,2:PRINT
 STRING$(78,CHR$(205)):COLOR 7,0
3620 RETURN
3630 REM' to erase the question boxIIIIIIIIIIIIIIIIIIIIIIIIIIIIIIIIIIIIIIIIIIII
3640 FOR J=1 TO 5:LOCATE (J+1),2:PRINT STRING$(78," "):NEXT:J=0
3650 FOR J=1 TO 8:LOCATE (J+8),2:PRINT STRING$(78," "):NEXT:J=0:RETURN
5000 CLS:GOSUB 2850:LOCATE 7,15:PRINT "You have read all of the selections in th
is group."
```

```
5010 LOCATE 8,12:PRINT "You are ready to advance to another unit. If you desire
"
5011 LOCATE 9,28:PRINT "you may repeat this unit."
5012 LOCATE 11,26:PRINT "To Continue Strike any Key."
5020 Q$=INPUT$(1):CLS:EN=1:KILL FILE$:GOTO 8115
6000 REM' this is the timing group at the end of the quizIIIIIIIIIIIIIIIIIIIIII
6001 REM' the time is reported in minutesIIIIIIIIIIIIIIIIIIIIIIIIIIIIIIIIIIIIII
6005 REM' THIS ELIMINATES CREATION OF THE .TCH FILE IIIIIIIIIIIIIIIIIIIIIIIIIII
6006 GOTO 6090
6010 TIM=((T2-T1)/60)
6030 EXT$="tch":FILE6$=INITIALS$+CHR$(46)+EXT$
6040 OPEN FILE6$ FOR APPEND AS #1
6050 WRITE #1,DAT$
6060 WRITE #1,F$
6070 WRITE #1,TIM
6075 WRITE #1,WPM$
6080 CLOSE
6090 RETURN
6500 CLS:REM'this is the teachers fileIIIIIIIIIIIIIIIIIIIIIIIIIIIIIIIIIIIIIIII
6505 X=0
6510 GOSUB 340:LOCATE 6,33:PRINT "TEACHER'S FILE"
6515 LOCATE 7,11:PRINT STRING$(60,CHR$(205))
6520 LOCATE 8,20:PRINT "ENTRY INTO THIS FILE REQUIRES A PASSWORD"
6530 LOCATE 9,15:PRINT "TYPE YOUR PASSWORD BELOW THEN STRIKE THE ENTER KEY"
6540 COLOR 5,0:LOCATE 12,20:PRINT CHR$(201)STRING$(40,CHR$(205))CHR$(187)
6550 Z=Z+1:FOR Z=1 TO 2:LOCATE (12+Z),20:PRINT CHR$(186):LOCATE (12+Z),61:PRINT
 CHR$(186):NEXT
6560 LOCATE 14,20:PRINT CHR$(200)STRING$(40,CHR$(205))CHR$(188):COLOR 7,0:COLOR
 7,0
6570 LOCATE 13,25:LINE INPUT;PW$:LOCATE 13,25:PRINT STRING$(35," ")
6580 IF PW$=PASSWORD$ THEN CLS:GOTO 6650
6590 BEEP:COLOR 31,0:LOCATE 19,28:PRINT "PASSWORD IS NOT ACCEPTED":COLOR 7,0
6600 LOCATE 20,35:PRINT "Try again":LOCATE 13,25:PRINT STRING$(36," ")
6610 X=X+1
6620 IF X=3 THEN GOTO 6630 ELSE 6570
6630 CLS:SYSTEM
6650 GOSUB 340:LOCATE 6,11:PRINT " Enter the initials of the student's reading r
ecord you wish"
6660 LOCATE 7,21:PRINT " to review, then strike the enter key."
6665 LOCATE 8,11:PRINT STRING$(60,CHR$(196))
6670 COLOR 5,0:LOCATE 9,19:PRINT "Use a space If there is no middle initial."
6680 LOCATE 10,37:PRINT CHR$(218)STRING$(3,CHR$(196))CHR$(191)
6690 LOCATE 11,37:PRINT CHR$(179):LOCATE 11,41:PRINT CHR$(179)
6700 LOCATE 12,37:PRINT CHR$(192)STRING$(3,CHR$(196))CHR$(217):COLOR 7,0
6710 LOCATE 11,38:LINE INPUT;INITIALS$
6720 LL=LEN(INITIALS$)
6730 IF LL<3 THEN BEEP:LOCATE 13,26:PRINT "You did not include a space !" ELSE 6
750
6740 LOCATE 11,38:PRINT "   ":GOTO 6710
6750 LOCATE 13,23:PRINT "   Are the initials correct Y/N   ":Q$=INPUT$(1)
6790 IF Q$="Y" OR Q$="y" THEN GOTO 6800 ELSE GOTO 6740
6800 CLS
6999 REM'large boxIIIIIIIIIIIIIIIIIIIIIIIIIIIIIIIIIIIIIIIIIIIIIIIIIIIIIIIIIIII
7000 COLOR 4,0:LOCATE 1,1:PRINT CHR$(201)STRING$(78,CHR$(205))CHR$(187)
7010 Z=Z+1:FOR Z=1 TO 18:LOCATE (1+Z),1:PRINT CHR$(186):LOCATE (1+Z),80:PRINT CH
R$(186):NEXT
7015 LOCATE 3,2:PRINT STRING$(78,CHR$(205))
7020 LOCATE 20,1:PRINT CHR$(200)STRING$(78,CHR$(205))CHR$(188):COLOR 7,0
7030 LOCATE 2,25:PRINT "THE STUDENTS INITIALS ARE ";INITIALS$:COLOR 7,0
```

```
7031 COLOR 5,0:LOCATE 2,76:PRINT "WPM":COLOR 7,0
7035 ON ERROR GOTO 7500
7040 LOCATE 19,2:PRINT"......1.........2...........3...........4...........5.......
...6.........7......."
7050 LOCATE 21,9:PRINT "MINUTES FROM THE BEGINING OF THE READING TO THE END OF T
HE QUIZ"
7060 EXT$="TCH":FILE7$=INITIALS$+CHR$(46)+EXT$
7065 X=0:Z=0
7070 OPEN FILE7$ FOR INPUT AS #1
7080 WHILE NOT EOF(1)
7090 INPUT #1,DAT$
7095 INPUT #1,F$
7100 INPUT #1,TIM:T=(TIM*10)
7105 INPUT #1,WPM$
7106 IF T> 70 THEN T=70
7107 IF T<25 THEN T=20
7110 X=X+1:LOCATE (3+X),2:PRINT STRING$(T,CHR$(205))F$" "
7115 IF T=20 THEN LOCATE (3+X),35:PRINT "Completed in less then 2.5 minutes"
7116 IF T=70 THEN LOCATE (3+X),35:PRINT "exceeds 7 min."
7118 LOCATE (3+X),75:PRINT WPM$
7119 LOCATE (3+X),3:PRINT DAT$
7120 IF X=14 THEN LOCATE 22,28:PRINT "To Continue Strike Any Key" ELSE 7130
7121 Q$=INPUT$(1):Z=Z+1:FOR Z=1 TO 14:LOCATE (3+Z),2:PRINT STRING$(78," "):NEXT
7123 Z=0:X=0
7130 WEND
7150 CLOSE
7160 COLOR 5,0:LOCATE (4+X),32:PRINT"END OF THIS FILE":COLOR 7,0
7170 LOCATE 22,21:PRINT "DO YOU WANT TO REVIEW ANOTHER FILE Y/N":Q$=INPUT$(1)
7180 IF Q$="Y" OR Q$="y" THEN GOTO 7190 ELSE GOTO 7200
7190 CLS:GOTO 6650
7200 CLS:EN=1:GOTO 8115
7500 LOCATE 10,14:PRINT "A file is not available with the initials you entered."
7510 LOCATE 11,16:PRINT "Do you want to enter another set of initials Y/N"
7520 Q$=INPUT$(1):CLS
7530 IF Q$="Y" OR Q$="y" THEN RESUME 6650 ELSE GOTO 7540
7540 EN=1:GOTO 8115
8000 REM' this is the fail to reach question thresholdIIIIIIIIIIIIIIIIIIIIIIIIIII
8010 EXT$="RCD":FILE$=INITIALS$+CHR$(46)+EXT$
8020 OPEN FILE$ FOR INPUT AS #1
8030 WHILE NOT EOF(1)
8040 INPUT #1,A$
8050 INPUT #1,F
8060 WEND
8070 CLOSE
8075 F=F-1
8080 OPEN FILE$ FOR OUTPUT AS #1
8090 WRITE #1,DAT$
8100 WRITE #1,F
8110 CLOSE
8115 IF EN=1 THEN CLS:COLOR 31:LOCATE 10,32:PRINT "ONE MOMENT PLEASE":RUN "READ.
BAS":COLOR 7,0:STOP
8120 CLS:GOSUB 2850
8125 LOCATE 8,38:PRINT "SORRY"
8130 LOCATE 9,16:PRINT "You must score "THRESH" percent or higher to advance to"
8140 LOCATE 10,32:PRINT "the next article."
8150 LOCATE 20,27:PRINT "To Continue Strike Any Key":Q$=INPUT$(1):CLS:RETURN
8200 REM' THIS IS TO LOAD THE VOCABULARY SLOW DOWN PROGRAM IIIIIIIIIIIIIIIIIIIII
8230 EXTZ$="BAS":STZ$="VOCAB"
8240 FILEZ$=STZ$+F$+CHR$(46)+EXTZ$
```

```
8250 OPEN FILEZ$ FOR INPUT AS #1:OPEN FILEZ$ FOR INPUT AS #2
8260 WHILE NOT EOF(2)
8261 INPUT #2,S$
8262 WD%=WD%+1
8263 WEND
8264 CLOSE #2
8265 WHILE NOT EOF (1)
8270 INPUT #1,WD1$
8275 IF WD%=1 THEN GOTO 8380
8280 INPUT #1,WD2$
8285 IF WD%=2 THEN GOTO 8380
8290 INPUT #1,WD3$
8295 IF WD%=3 THEN GOTO 8380
8300 INPUT #1,WD4$
8305 IF WD%=4 THEN GOTO 8380
8310 INPUT #1,WD5$
8315 IF WD%=5 THEN GOTO 8380
8320 INPUT #1,WD6$
8325 IF WD%=6 THEN GOTO 8380
8330 INPUT #1,WD7$
8335 IF WD%=7 THEN GOTO 8380
8340 INPUT #1,WD8$
8345 IF WD%=8 THEN GOTO 8380
8350 INPUT #1,WD9$
8355 IF WD%=9 THEN GOTO 8380
8360 INPUT #1,WD10$
8370 WEND
8380 CLOSE
8390 RETURN
8400 REM' THIS WILL INTRODUCE THE TIME DELAY FOR THE VOCABULARY PROGRAM ZZZZZZZ
8405 WD=1
8410 I=INSTR(A1$,WD1$)
8415 LL=LEN(WD1$)
8420 IF I>0 THEN WDA$=WD1$:GOTO 9000
8425 IF WD%=1 THEN RETURN
8430 I=INSTR(A1$,WD2$)
8435 LL=LEN(WD2$)
8440 IF I>0 THEN WDA$=WD2$:GOTO 9000
8445 IF WD%=2 THEN RETURN
8450 I=INSTR(A1$,WD3$)
8455 LL=LEN(WD3$)
8460 IF I>0 THEN WDA$=WD3$:GOTO 9000
8465 IF WD%=3 THEN RETURN
8470 I=INSTR(A1$,WD4$)
8475 LL=LEN(WD4$)
8480 IF I>0 THEN WDA$=WD4$:GOTO 9000
8485 IF WD%=4 THEN RETURN
8490 I=INSTR(A1$,WD5$)
8495 LL=LEN(WD5$)
8500 IF I>0 THEN WDA$=WD5$:GOTO 9000
8505 IF WD%=5 THEN RETURN
8510 I=INSTR(A1$,WD6$)
8515 LL=LEN(WD6$)
8520 IF I>0 THEN WDA$=WD6$:GOTO 9000
8525 IF WD%=6 THEN RETURN
8530 I=INSTR(A1$,WD7$)
8535 LL=LEN(WD7$)
8540 IF I>0 THEN WDA$=WD7$:GOTO 9000
8545 IF WD%=7 THEN RETURN
```

```
8550 I=INSTR(A1$,WD8$)
8555 LL=LEN(WD8$)
8560 IF I>0 THEN WDA$=WD8$:GOTO 9000
8565 IF WD#=8 THEN RETURN
8570 I=INSTR(A1$,WD9$)
8573 LL=LEN(WD9$)
8575 IF I>0 THEN WDA$=WD9$:GOTO 9000
8576 IF WD#=9 THEN RETURN
8580 I=INSTR(A1$,WD10$)
8585 LL=LEN(WD10$)
8590 IF I>0 THEN WDA$=WD10$:GOTO 9000 ELSE RETURN
9000 REM' If the first letter is found this is the check XXXXXXXXXXXXXXXXXXXXX
9010 WD$=MID$(A1$,I,LL)
9020 IF WD$=WDA$ THEN GOTO 9025 ELSE 9030
9025 IF BP=1 THEN BEEP:WD=3:GOTO 9030
9026 WD=3
9030 RETURN
9100 REM' THIS IS THE SWITCH TO TURN THE BEEP ON/OFF XXXXXXXXXXXXXXXXXXXXXXXXX
9110 LOCATE 10,15:PRINT "DO YOU WANT THE SOUND TURNED ON FOR THE VOCABULARY"
9120 LOCATE 11,27:PRINT "IDENTIFICATION PROGRAM Y/N"
9130 Q$=INPUT$(1)
9140 IF Q$="Y" OR Q$="y" THEN BP=1
9150 LOCATE 10,15:PRINT STRING$(50," ")
9160 LOCATE 11,27:PRINT STRING$(40," ")
9170 RETURN
9200 REM' TO DISPLAY VOCABULARY WORDS XXXXXXXXXXXXXXXXXXXXXXXXXXXXXXXXXXXXXXX
9201 CLS:COLOR 3,0:LOCATE 1,1:PRINT CHR$(201)STRING$(78,CHR$(205))CHR$(187)
9202 FOR X=1 TO 20:LOCATE (1+X),1:PRINT CHR$(186):LOCATE (1+X),80:PRINT CHR$(186
):NEXT:X=0
9203 LOCATE 21,1:PRINT CHR$(200)STRING$(78,CHR$(205))CHR$(188):COLOR 7,0
9205 LL=LEN(COLLECTION$):LL1=(LL/2):LOCATE 2,(40-LL1):PRINT COLLECTION$
9206 LOCATE 4,39:PRINT F
9207 COLOR 3,0:LOCATE 3,2:PRINT STRING$(78,CHR$(205)):COLOR 7,0
9210 LOCATE 5,29:PRINT "VOCABULARY STUDY WORDS":V=0
9220 COLOR 5,0:LOCATE 6,29:PRINT CHR$(201)STRING$(20,CHR$(205))CHR$(187)
9230 FOR X=1 TO 12:LOCATE (6+X),29:PRINT CHR$(186):LOCATE (6+X),50:PRINT CHR$(18
6):NEXT
9240 LOCATE 18,29:PRINT CHR$(200)STRING$(20,CHR$(205))CHR$(188):COLOR 7,0
9250 EXT$="BAS":NAM$="VOCAB"
9260 UNIT$=NAM$+F$+CHR$(46)+EXT$
9270 OPEN UNIT$ FOR INPUT AS #1
9275 WHILE NOT EOF(1)
9280 INPUT #1, VOC$
9285 LL=LEN(VOC$):LL1=(LL/2)
9290 V=V+1:LOCATE (6+V),(40-LL1):PRINT VOC$
9300 WEND
9310 CLOSE
9320 COLOR 5,0:LOCATE 22,27:PRINT "To Continue Strike any Key":Q$=INPUT$(1):CLS
9325 LOCATE 9,5:PRINT CHR$(201)STRING$(73,CHR$(205))CHR$(187)
9326 LOCATE 10,5:PRINT CHR$(186):LOCATE 10,79:PRINT CHR$(186)
9327 LOCATE 11,5:PRINT CHR$(200)STRING$(73,CHR$(205))CHR$(188)
9330 COLOR 7,0:LOCATE 10,11:PRINT "DO YOU WANT TO REVIEW THE VOCABULARY WORDS DE
FINITIONS Y/N"
9340 Q$=INPUT$(1):CLS:X=0
9344 IF Q$="N" OR Q$="n" THEN GOTO 9475
9345 COLOR 5,0:LOCATE 1,1:PRINT CHR$(201)STRING$(78,CHR$(205))CHR$(187)
9346 FOR X=1 TO 19:LOCATE (1+X),1:PRINT CHR$(186):LOCATE (1+X),80:PRINT CHR$(186
):NEXT
9347 LOCATE 20,1:PRINT CHR$(200)STRING$(78,CHR$(205))CHR$(188):X=0:COLOR 7,0
```

```
9350 LL=LEN(COLLECTION$):LL1=(LL/2):LOCATE 2,(40-LL1):PRINT COLLECTION$
9355 COLOR 5,0:LOCATE 3,2:PRINT STRING$(78,CHR$(205)):X=0:COLOR 7,0
9356 LOCATE 4,39:PRINT F
9360 NAM$="DEF":UNIT$=NAM$+F$+CHR$(46)+EXT$
9370 OPEN UNIT$ FOR INPUT AS #1
9380 WHILE NOT EOF(1)
9390 LINE INPUT #1, DF$
9395 I=INSTR(DF$,":")
9400 COLOR 5,0:X=X+1:LOCATE (6+X),7:PRINT DF$:COLOR 7,0
9445 LOCATE (6+X),7:PRINT LEFT$(DF$,I)
9450 WEND
9460 CLOSE
9470 LOCATE 22,27:PRINT "To Continue Strike any Key":Q$=INPUT$(1):CLS:COLOR 5,0
9475 COLOR 5,0:GOSUB 340:COLOR 7,0:LOCATE 10,14:PRINT "DO YOU WANT TO STUDY THE
VOCABULARY WORDS BEFORE YOU":LOCATE 5,5:LL=LEN(COMPANY$):L1=FIX(LL/2):LOCATE 4,(
40-L1):PRINT COMPANY$:LL=LEN(COLLECTION$):L1=FIX(LL/2):LOCATE 6,(40-L1):PRINT CO
LLECTION$
9476 LOCATE 11,28:PRINT "BEGIN TO READ THE TEXT?"
9477 LOCATE 14,38:PRINT "Y/N":Q$=INPUT$(1):CLS
9478 IF Q$="Y" OR Q$="y" THEN COLOR 31,0:LOCATE 10,31:PRINT "ONE MOMENT PLEASE":
COLOR 7,0:CHAIN "menu2.bas",,ALL
9480 COLOR 31,0:LOCATE 10,31:PRINT "ONE MOMENT PLEASE":COLOR 7,0:RETURN
9500 REM' THIS IS THE HELP OR INTRODUCTION PROGRAM XXXXXXXXXXXXXXXXXXXXXXXXXXXXX
9505 COLOR 7,0:LOCATE 4,32:PRINT "LIBRARY VOLUME 2"
9510 LOCATE 7,34:PRINT "PVA SYSTEMS"
9520 COLOR 5,0:LOCATE 8,36:PRINT "presents":COLOR 7,0
9530 LOCATE 10,23:PRINT CHR$(34)"RATE BUILDER     RATE BUILDER PLUS"CHR$(34)
9540 COLOR 5,0:LOCATE 10,37:PRINT "and"
9550 LOCATE 13,19:PRINT "Would you like to review the instructions"
9560 LOCATE 14,30:PRINT "for this program":COLOR 7,0
9570 COLOR 31,0:LOCATE 14,48:PRINT "Y/N":COLOR 7,0:Q$=INPUT$(1)
9580 IF Q$="N" OR Q$="n" THEN CLS:RETURN
9590 IF Q$="Y" OR Q$="y" THEN GOTO 9610 ELSE 9600
9600 BEEP:LOCATE 20,25:PRINT "YOU MUST STRIKE THE Y OR N KEY":GOTO 9570
9610 CLS:COLOR 5,0:LOCATE 1,20:PRINT CHR$(201)STRING$(40,CHR$(205))CHR$(187)
9620 FOR X=1 TO 19:LOCATE (X+1),20:PRINT CHR$(186):LOCATE (X+1),61:PRINT CHR$(18
6):NEXT
9630 LOCATE 20,20:PRINT CHR$(200)STRING$(40,CHR$(205))CHR$(188)
9635 COLOR 31,0:LOCATE 9,32:PRINT "ONE MOMENT PLEASE":COLOR 7,0
9640 X=0
9650 OPEN "help.bas"FOR INPUT AS #1
9655 LOCATE 9,32:PRINT "
9660 WHILE NOT EOF(1)
9670 LINE INPUT #1,L$
9680 X=X+1:LOCATE (X+2),24:PRINT L$
9685 IF X>15 THEN GOSUB 9710
9686 COLOR 6,0:LOCATE 21,27:PRINT "To Continue Strike any Key"
9687 LOCATE 22,35:PRINT "Esc= exit":COLOR 7,0
9690 WEND:GOSUB 9710
9700 CLOSE
9705 GOTO 9790
9710 Q$=INPUT$(1):X=0
9715 IF Q$=CHR$(27) THEN CLS:RUN "read.bas"
9720 FOR X=1 TO 17:LOCATE (X+2),24:PRINT STRING$(35," "):NEXT
9730 X=0:RETURN
9790 LOCATE 10,37:PRINT "THE END"
9800 BEEP:COLOR 7,0:LOCATE 21,19:PRINT "Do you want to repeat the Instructions Y
/N"
9810 Q$=INPUT$(1):LOCATE 21,19:PRINT STRING$(45," ")
```

```
9820 IF Q$="N" OR Q$="n" THEN CLS:RETURN
9825 IF Q$=CHR$(27) THEN CLS:RUN"READ.BAS"
9830 FOR X=1 TO 17:LOCATE (X+2),25:PRINT STRING$(35," "):NEXT:GOTO 9635
10000 STOP
12500 DATA "Daniel Hotz, 22, "
12510 DATA "graduated from St. "
12520 DATA "John's University in "
12530 DATA "Minnesota last May. "
12540 DATA " He had been "
12550 DATA "working in Washington, "
12560 DATA "D.C., for only "
12570 DATA "a week when "
12580 DATA "he was accosted "
12590 DATA "outside his apartment "
12600 DATA "near Capitol Hill. "
12610 DATA " Hotz refused to "
12620 DATA "give up his "
12630 DATA "wallet and was "
12640 DATA "shot. He died "
12650 DATA "later in the "
12660 DATA "hospital. The next "
12670 DATA "day, Derrick Conner, "
12680 DATA "just turned 13, "
12690 DATA "was gunned down "
12700 DATA "in a crack "
12710 DATA "house in Washington. "
12720 DATA " Conner, a sixth "
12730 DATA "grader, had been "
12740 DATA "the student leader "
12750 DATA "of a program "
12760 DATA "for vulnerable children "
12770 DATA "at his school. "
12780 DATA " Be he quit "
12790 DATA "that to become "
12800 DATA "a runner for "
12810 DATA "a drug dealer. "
12820 DATA " A week before, "
12830 DATA "Rhonda Anthony, 33, "
12840 DATA "married and the "
12850 DATA "mother of a "
12860 DATA "seven year old "
12870 DATA "boy, was sitting "
12880 DATA "on her front "
12890 DATA "porch in a "
12900 DATA "poor section of "
12910 DATA "the city. She "
12920 DATA "was killed by "
12930 DATA "a stray bullet "
12940 DATA "from a gunfight "
12950 DATA "between drug dealers. "
12960 DATA " These are scenes "
12970 DATA "from the Washington "
12980 DATA "rarely encountered by "
12990 DATA "top government officials "
13000 DATA "or tourists. Away "
13010 DATA "from the monuments, "
13020 DATA "federal offices and "
13030 DATA "million dollar homes, "
13040 DATA "our capital is "
```

```
13050 DATA "a city of "
13060 DATA "crime and squalor. "
13070 DATA " Its government, headed "
13080 DATA "by Mayor Marion "
13090 DATA "Barry, is perhaps "
13100 DATA "the most inept "
13110 DATA "in America. This "
13120 DATA "Washington is a "
13130 DATA "national disgrace:. Washington "
13140 DATA "has more police "
13150 DATA "per citizen than "
13160 DATA "any city in "
13170 DATA "the country. Yet "
13180 DATA "the crime rate "
13190 DATA "was up 17 "
13200 DATA "percent last year "
13210 DATA "and, per capita, "
13220 DATA "Washington has become "
13230 DATA "the nation's murder "
13240 DATA "capital. Killings soared "
13250 DATA "from 228 in "
13260 DATA "1987 to 372 "
13270 DATA "in 1988, and "
13280 DATA "are expected to "
13290 DATA "go even higher "
13300 DATA "by the end "
13310 DATA "of 1989. These "
13320 DATA "grim statistics reflect "
13330 DATA "an explosion in "
13340 DATA "drug trafficking. 'When "
13350 DATA "I was growing "
13360 DATA "up in Washington, "
13370 DATA "there were a "
13380 DATA "few places you "
13390 DATA "didn't go at "
13400 DATA "night,' says Juluis "
13410 DATA "Hobson, an aide "
13420 DATA "to Sen. Charles "
13430 DATA "Robb (D. Va.). "
13440 DATA "'Now there are "
13450 DATA "a lot of "
13460 DATA "places you don't "
13470 DATA "walk around in "
13480 DATA "the daytime.' Washington "
13490 DATA "spends $5742 a "
13500 DATA "year per pupil "
13510 DATA "on education, more "
13520 DATA "than all but "
13530 DATA "three states. Still, "
13540 DATA "the public schools "
13550 DATA "are among the "
13560 DATA "worst in the "
13570 DATA "country, with a "
13580 DATA "44.5 percent dropout "
13590 DATA "rate. The grade "
13600 DATA "point average for "
13610 DATA "high school students "
13620 DATA "is 1.73, a "
13630 DATA "C minus, with "
```

```
13640 DATA "22 percent of "
13650 DATA "the grades being "
13660 DATA "F's.  Only two "
13670 DATA "members of Congress "
13680 DATA "(out of 535) "
13690 DATA "had children in "
13700 DATA "the city's public "
13710 DATA "schools last term. "
13720 DATA " When Barry was "
13730 DATA "first elected mayor, "
13740 DATA "he declared that "
13750 DATA "city officials had "
13760 DATA "a 'moral responsibility' "
13770 DATA "to send their "
13780 DATA "kids to public "
13790 DATA "schools. Now his "
13800 DATA "son Christopher attends "
13810 DATA "St. Albans, an "
13820 DATA "elite private school. "
13830 DATA "The city's housing "
13840 DATA "department, which runs "
13850 DATA "52 public housing "
13860 DATA "developments, has many "
13870 DATA "more maintenance workers "
13880 DATA "than federal housing "
13890 DATA "officials recommend. Yet "
```

APPENDIX 2

```
1 CLS
2 PRINT TAB(20)"            PVA SYSTEMS PRESENTS"
3 PRINT
5 PRINT TAB(17)"          SPELLING UNIT 8-1"
6 PRINT
7 PRINT TAB(11)"This program is protected by copyright laws and  internal"
8 PRINT TAB(31)"security measures."
9 PRINT
10 PRINT
11 PRINT
12 PRINT
13 PRINT
14 PRINT
15 PRINT
16 PRINT
17 PRINT
18 PRINT TAB(33)" 5 August 1987"
20 FOR A=1 TO 6000
21 NEXT A
22 CLS
30 PRINT TAB(20)"This is a speed training program and my name is GEORGE.....what is your"
31 PRINT "name ????"
32 PRINT
33 PRINT
34 PRINT
35 LINE INPUT"Please enter your name...";N$
37 PRINT
38 PRINT
39 PRINT
40 PRINT
45 LINE INPUT"Please enter todays date..........";D4$
46 CLS
50 PRINT
60 PRINT"I am very glad to meet you ";N$" are you familiar with this program if"
61 PRINT"so just enter the number 1. If you need more information enter 2."
62 PRINT
63 PRINT
```

```
64 PRINT TAB(25)"1-If you are ready to start spelling"
65 PRINT TAB(25)"2-If you need more information"
66 PRINT
67 PRINT
68 INPUT "Enter your number here..........";L
69 CLS
81 IF L=2 THEN 5990
82 CLS
117 CLS
120 REM Start the instructions for the spelling drill at line 150.Remember to
put a line between the words gosub 4000 for the flash sequence.
121 REM following that read gosub 4000. ie. 130 for text 135 gosub. Insert a
122 REM time delay loop following the first group of words.
130 PRINT"I will now show you each word that we are going to study. After I"
131 PRINT"type the word on the screen you do the same thing.";N$" Remember to"
132 PRINT"use capitals if I do or I will mark them wrong. There will be ten "
133 PRINT"words in this drill."
134 V=TIMER
150 C$="DEMONSTRATION"
160 D$="CADET"
170 E$="UTENSIL"
180 F$="ADEQUATE"
190 G$="INFINITE"
200 H$="MAXIMUM"
210 I$="MONOTONOUS"
220 J$="FRAIL"
230 K$="TOLERANT"
240 L$="VIGOROUS"
250 PRINT
260 PRINT
270 PRINT
280 PRINT"The word is............................";C$
290 INPUT"You type the word....................";C1$
300 IF C$=C1$ THEN GOTO 310
305 GOTO 280
310 CLS
320 PRINT"The word is............................";D$
330 INPUT"You type the word....................";D1$
340 IF D$=D1$ THEN GOTO 355
350 GOTO 320
355 CLS
360 PRINT"The word is............................";E$
370 INPUT"You type the word....................";E1$
380 IF E$=E1$ THEN GOTO 400
390 GOTO 360
400 CLS
410 PRINT"The word is............................";F$
420 INPUT"You type the word....................";F1$
430 IF F$=F1$ THEN GOTO 450
440 GOTO 410
450 CLS
460 PRINT"The word is............................";G$
470 INPUT"You type the word....................";G1$
480 IF G$=G1$ THEN GOTO 500
490 GOTO 460
500 CLS
510 PRINT"The word is............................";H$
520 INPUT"You type the word....................";H1$
530 IF H$=H1$ THEN GOTO 550
540 GOTO 510
550 CLS
560 PRINT"The word is............................";I$
570 INPUT"You type the word....................";I1$
580 IF I$=I1$ THEN GOTO 600
590 GOTO 560
600 CLS
610 PRINT"The word is............................";J$
620 INPUT"You type the word....................";J1$
630 IF J$=J1$ THEN GOTO 650
640 GOTO 610
650 CLS
660 PRINT"The word is............................";K$
670 INPUT"You type the word....................";K1$
680 IF K$=K1$ THEN GOTO 700
```

```
690 GOTO 660
700 CLS
710 PRINT"The word is........................";L$
720 INPUT"You type the word...................";L1$
730 IF L$=L1$ THEN GOTO 750
740 GOTO 710
750 CLS
760 PRINT TAB(10)"OK ";N$" now I will add something else.I will flash the word"
770 PRINT TAB(10)"and you then type what you see. If you get the word correct"
780 PRINT TAB(10)"I will give you the words definition. When you are ready just"
790 PRINT TAB(10)"press return and away we go........"
800 INPUT ;S9
810 CLS
820 PRINT"The word is........";C$
830 GOSUB 3500
840 CLS
850 INPUT"Enter the word.........";C2$
860 IF C$=C2$ THEN GOTO 880
870 GOTO 820
880 PRINT
890 PRINT
900 PRINT"AN OUTWARD EXPRESSION OR DISPLAY."
910 INPUT"Ready for the next word...press enter......";Q
920 CLS
930 PRINT"The word is..........";D$
940 GOSUB 3500
950 CLS
960 INPUT"Enter the word.........";D2$
975 PRINT
980 IF D$=D2$ THEN GOTO 1000
990 GOTO 930
1000 PRINT
1020 PRINT
1030 PRINT"A STUDENT IN A SERVICE ACADEMY."
1040 PRINT
1060 INPUT"Ready for the next word...press enter/return....";Q
1070 CLS
1080 PRINT"The word is............";E$
1090 GOSUB 3500
1100 CLS
1110 INPUT"Enter the word........";E2$
1120 IF E$=E2$ THEN GOTO 1140
1121 GOTO 1080
1130 PRINT
1140 PRINT
1150 PRINT"AN INSTRUMENT USED IN A HOUSEHOLD ."
1160 INPUT"Ready for the next word...press enter/return....";Q
1170 CLS
1180 PRINT"The word is..............";F$
1190 GOSUB 3500
1195 CLS
1200 INPUT"Enter the word..........";F2$
1210 IF F$=F2$ THEN GOSUB 1230
1220 GOTO 1180
1230 PRINT
1240 PRINT
1250 PRINT"SUITABLE FOR A SPECIFIC REQUIREMENT."
1270 INPUT"Ready for the next word.......";Q
1280 CLS
1290 PRINT"The word is...................";G$
1300 GOSUB 3500
1310 CLS
1320 INPUT"Enter the word..............";G2$
1340 IF G$=G2$ THEN GOSUB 1360
1350 GOTO 1290
1360 PRINT
1370 PRINT
1380 PRINT"INFINITE MEANS WITHOUT LIMITS."
1390 INPUT"Ready for the next word........";Q
1400 CLS
1410 PRINT"The word is...................";H$
1420 GOSUB 3500
1430 CLS
```

```
1440 INPUT"Enter the word................";H2$
1450 IF H$=H2$ THEN GOSUB 1470
1460 GOTO 1410
1470 PRINT
1480 PRINT
1490 PRINT"MAXIMUN IS THE UPPER LIMIT ALLOWED."
1500 PRINT
1510 INPUT"Ready for the next word........";Q
1520 CLS
1530 PRINT"The word is....................";I$
1540 GOSUB 3500
1550 CLS
1560 INPUT"Enter the word................";I2$
1580 IF I$=I2$ THEN GOSUB 1600
1590 GOTO 1530
1600 PRINT
1610 PRINT
1620 PRINT"MONOTONOUS IS THE SAME AS TIRESOME."
1630 INPUT"Ready for another word....press enter/return....";Q
1640 CLS
1650 PRINT"The word is....................";J$
1660 GOSUB 3500
1670 CLS
1680 INPUT"Enter the word................";J2$
1690 IF J$=J2$ THEN GOSUB 1710
1700 GOTO 1650
1710 PRINT
1720 PRINT
1730 PRINT"FRAIL IS THE SAME AS WEAK."
1740 INPUT"Ready to do another word ? There are only 2 more.....";Q
1750 CLS
1760 PRINT"The word is....................";K$
1770 GOSUB 3500
1780 CLS
1790 INPUT"Enter the word................";K2$
1800 IF K$=K2$ THEN GOSUB 1820
1810 GOTO 1760
1820 PRINT
1830 PRINT
1840 PRINT"HAVING SYMPATHY FOR DIFFERENT BELIEFS."
1850 INPUT"Ready for the next word..................";Q
1860 CLS
1870 PRINT"The word is....................";L$
1880 GOSUB 3500
1890 CLS
1900 INPUT"Enter the word................";L2$
1910 IF L$=L2$ THEN GOSUB 1930
1920 GOTO 1870
1930 PRINT
1940 PRINT
1950 PRINT"DONE WITH FORCE AND ENERGY."
1958 FOR PP=1 TO 2000
1959 NEXT PP
1960 PRINT
1970 PRINT
1980 PRINT
1990 PRINT:CLS
2000 PRINT"Okay ";N$" you have done very well with your learning drill's."
2010 PRINT"Now we will have a little test. The first part of the test will"
2020 PRINT"cover only the spelling words. I will flash them for you just as"
2030 PRINT"before, just a little faster. There will be twenty flashes but"
2040 PRINT"only ten words. You will only have one chance for each flash and"
2050 PRINT"I will correct your test at the end of the second part of the test"
2060 PRINT"which will cover the vocabulary or definitions. I will tell you"
2070 PRINT"about that part of the test when you finish the spelling.."
2080 PRINT"Why don't you rest for a moment, when you are ready press"
2090 INPUT"return/enter..........";Q
2095 ZZ=0
2100 CLS
2110 FOR Z9=1 TO 1000
2120 NEXT Z9
2130 FOR L=1 TO 20
2140 RANDOMIZE TIMER
```

```
2150 LET Y=INT((RND*10)+1)
2160 IF Y=1 GOTO 2290
2170 IF Y=2 GOTO 2300
2180 IF Y=3 GOTO 2320
2190 IF Y=4 GOTO 2340
2200 IF Y=5 GOTO 2360
2210 IF Y=6 GOTO 2380
2220 IF Y=7 GOTO 2400
2230 IF Y=8 GOTO 2420
2240 IF Y=9 GOTO 2440
2250 IF Y=10 GOTO 2460
2280 LET Q$=C$
2290 GOTO 2480
2300 LET Q$=D$
2310 GOTO 2480
2320 LET Q$=E$
2330 GOTO 2480
2340 LET Q$=F$
2350 GOTO 2480
2360 LET Q$=G$
2370 GOTO 2480
2380 LET Q$=H$
2390 GOTO 2480
2400 LET Q$=I$
2410 GOTO 2480
2420 LET Q$=J$
2430 GOTO 2480
2440 LET Q$=K$
2450 GOTO 2480
2460 LET Q$=L$
2470 GOTO 2480
2480 PRINT"The word is...................";Q$
2490 FOR Z=1 TO 300
2500 NEXT Z
2510 CLS
2520 INPUT"Type the word you saw.........";S$
2530 CLS
2540 . IF Q$=S$ THEN GOSUB 2830
2550 NEXT L
2561 PRINT
2562 PRINT
2565 IF ZZ=100 THEN GOSUB 3000
2575 PRINT"Your score on the spelling test was ";ZZ"%.Not 100%, I would"
2585 PRINT"rather not go on to the vocabulary test."N$" At this point you can"
2595 PRINT"do the drill over or just do the test over or if you would rather"
2605 PRINT"just end the drill and do it some other time we could do that. You"
2615 PRINT"will find your choices below. Select the number and enter it."
2625 PRINT
2635 PRINT
2645 PRINT
2655 PRINT
2665 PRINT
2675 PRINT TAB(20)"1-Repeat the drill"
2685 PRINT TAB(20)"2-Repeat the test"
2695 PRINT TAB(20)"3-End the drill"
2700 ZZ=ZZ+1*5
2705 PRINT
2715 PRINT
2725 PRINT
2735 INPUT"Enter the number you have selected........";PP
2745 CLS
2755 IF PP=1 GOTO 100
2765 IF PP=2 GOTO 2000
2775 PRINT"Okay ";N$" it has been a lot of fun.  Lets do it again sometime"
2785 PRINT"really soon."
2795 END
2805 PRINT"Let me explain the vocabulary drill."N$" Relax, this isn't going to"
2815 PRINT"hurt."
2825 END
2830 ZZ=ZZ+1*5
2835 RETURN
3000 CLS
3010 PRINT"I am very proud of you ";N$" you scored 100% on the spelling portion"
```

```
3020 PRINT"and now you are ready for the vocabulary test. We are going to use"
3030 PRINT"the ten words that you have learned to spell and that I have defined"
3040 PRINT"for you in the drill. I will write a sentence on the screen and I"
3050 PRINT"will omit one word. That word will be one of the words we have just"
3060 PRINT"studied.  You will then enter the correct word and be careful that"
3070 PRINT"you spell the word correctly. I will mark the sentence wrong     "
3080 PRINT"if you misspell the word.";N$" Please read the instructions  again"
3090 PRINT"before we go on. You will only have one chance at each sentence so"
3100 PRINT"take your time."
3101 TT=0
3110 PRINT
3130 PRINT
3150 PRINT
3170 INPUT"Press the enter/return key when you are ready to go on........";Q
3190 CLS
3210 LOCATE 10,10:PRINT"1-INFINITE MEANS   WITHOUT LIMITS."
3220 INPUT"The missing word is...........";A3$
3221 PRINT"The word should have been.....";G$
3225 IF A3$=G$ THEN GOSUB 4000
3226 GOSUB 8000
3227 LOCATE 10,10:PRINT"2-_____ IS AN OUTWARD EXPRESSION OR DISPLAY."
3230 INPUT"The missing word is............";B3$
3231 PRINT"The word should have been......";C$
3232 IF C$=B3$ THEN GOSUB 4000
3233 GOSUB 8000
3250 LOCATE 10,10:PRINT" 3-A _____ IS A STUDENT IN A SERVICE ACADEMY."
3260 INPUT"The missing word is............";C3$
3261 PRINT"The word should have been......";D$
3262 IF D$=C3$ THEN GOSUB 4000
3263 GOSUB 8000
3270 LOCATE 10,10:PRINT" A _____ IS AN INSTRUMENT USED IN A HOUSHOLD."
3280 INPUT"The missing word is............";D3$
3281 PRINT"The word should have been.......";E$
3282 IF E$=D3$ THEN GOSUB 4000
3283 GOSUB 8000
3290 LOCATE 10,10:PRINT" 5-AN ACTION IS DONE WITH FORCE AND ENERGY MAY BE "
3291 LOCATE 11,10:PRINT"   CALLED _____."
3300 INPUT"The missing word is..............";E3$
3301 PRINT"The word should have been........";L$
3302 IF L$=E3$ THEN GOSUB 4000
3303 GOSUB 8000
3310 LOCATE 10,10:PRINT" 6-TO BE _____ IS TO HAVE SYMPATHY FOR DIFFERENT"
3311 LOCATE 11,10:PRINT"   BELIEFS."
3320 INPUT"The missing word is..............";F3$
3321 PRINT"The word should have been........";K$
3322 IF F3$=K$ THEN GOSUB 4000
3323 GOSUB 8000
3330 LOCATE 10,10:PRINT" 7-_____ IS THE UPPER LIMIT ALLOWED."
3340 INPUT"The missing word is............";G3$
3341 PRINT"The word should have been........";H$
3342 IF H$=G3$ THEN GOSUB 4000
3343 GOSUB 8000
3350 LOCATE 10,10:PRINT" 8-_____ IS THE SAME A TIRESOME."
3360 INPUT"The missing word is...............";H3$
3361 PRINT"The word should have been.........";I$
3362 IF I$=H3$ THEN GOSUB 4000
3363 GOSUB 8000
3370 LOCATE 10,10:PRINT" 9-TO BE _____ IS TO BE SUITABLE FOR A SPECIFIC"
3371 LOCATE 11,10:PRINT"    REQUIREMENT"
3380 INPUT"The missing word is...............";I3$
3381 PRINT"The word should have been.........";F$
3382 IF F$=I3$ THEN GOSUB 4000
3383 GOSUB 8000
3390 LOCATE 10,10:PRINT"10-_____ IS THE SAME AS WEAK."
3410 INPUT"The missing word is................";J3$
3411 PRINT"The word should have been..........";J$
3412 IF J3$=J$ THEN GOSUB 4000
3413   V1=TIMER
3414 GOSUB 8000
3415 GOSUB 4050
3500 FOR X9=1 TO 1000
3510 NEXT X9
3520 RETURN
```

```
4000 TT=TT+1*10
4010 RETURN
4050 CLS
4055 X=(V1-V)\1
4060 M=X\60
4065 GOSUB 8000
4099 CLS
4100 PRINT"Alright ";N$" we have completed the vocabulary test. And you"
4110 PRINT"scored ";TT"%.  Now if you will get the printer READY I will give"
4120 PRINT"you a written report. When the printer is all set just press the"
4130 INPUT"return/enter key........";Q
4131 LPRINT
4132 LPRINT
4133 LPRINT"                 HI TECH INFORMATION & EDUCTAIONAL SYSTEMS"
4134 LPRINT"                           SPELLING UNIT 8-1"
4135 LPRINT
4140 LPRINT TAB(50)D4$
4150 LPRINT
4160 LPRINT
4170 LPRINT TAB(10)"Dear ";N$;"
4180 LPRINT TAB(10)"I want you to know that I really enjoyed working with you "
4190 LPRINT TAB(10)"on the this drill. As you understand from the instructions"
4200 LPRINT TAB(10)"you did get 100% on the spelling test and that is what"
4210 LPRINT TAB(10)"allowed you to go on to the vocabulary  test. Now, you"
4220 LPRINT TAB(10)"scored ";TT"% on the vocabulary test and I will give you"
4230 LPRINT TAB(10)"a copy of the words as I gave them to you and a list of the"
4240 LPRINT TAB(10)"words that you entered. It is also interesting to note that"
4250 LPRINT TAB(10)"you devoted ";M" minutes to this exercise. "
4260 LPRINT TAB(10)"Its been fun ";N$". LETS DO IT AGAIN SOON."
4270 LPRINT
4280 LPRINT
4290 LPRINT
4300 LPRINT
4310 LPRINT
4320 LPRINT
4330 LPRINT"   The first word below is the correct word. The second word is your input."
4340 LPRINT"                        1-"G$ ,A3$
4350 LPRINT"                        2-"C$ ,B3$
4360 LPRINT"                        3-"D$ ,C3$
4370 LPRINT"                        4-"E$ ,D3$
4380 LPRINT"                        5-"L$ ,E3$
4390 LPRINT"                        6-"K$ ,F3$
4400 LPRINT"                        7-"H$ ,G3$
4410 LPRINT"                        8-"I$ ,H3$
4420 LPRINT"                        9-"F$ ,I3$
4430 LPRINT"                       10-"J$ ,J3$
4440 LPRINT
4450 LPRINT
4460 LPRINT"                          GEORGE "
4470 CLS
4480 PRINT"If you would like to repeat the entire drill enter the number 1 "
4490 PRINT"at the cursor. If you would like to repeat the vocabulary test enter"
4500 PRINT"the number 2. If you are done for the day enter number 3."
4510 LOCATE 10,10:INPUT"Enter your choice here.........";Q
4515 CLS
4520 IF Q=1 GOTO 130
4530 IF Q=2 GOTO 3210
4540 IF Q=3 GOTO 4550
5990 PRINT"As you know this is a combination spelling and vocabulary building"
6000 PRINT"program. The approach is very simple. I will first show you a word"
6010 PRINT"and then I will ask you to type the word as you see it. You must pay"
6020 PRINT"close attention to Capitals. If I use a capital letter and you don't"
6030 PRINT"I  will mark it wrong and vica versa. Study the word as you see it"
6040 PRINT"and don't try to go to fast. "
6050 PRINT
6060 PRINT"After you have seen the words twice and you can spell the words I "
6070 PRINT"give you the definition of each of the words. You must learn the"
6080 PRINT"definitions because  I will give you a test on them. At the end."
6090 PRINT"Read all of the instructions carefully and have fun.."
6091 PRINT
6092 PRINT
6093 PRINT
```

```
5100 INPUT"If you are ready to go to work press enter/return......";P
5101 CLS
6110 GOTO 130
8000 FOR Z10=1 TO 2500
8010 NEXT Z10
8015 CLS
8020 RETURN
```

What is claimed is:

1. A tachistoscope comprising:

means for successively presenting visual stimuli (i) at a base presentation rate between successive presentations, and (ii) at a base presentation latency time duration during which each visual stimuli is viewable; and means for automatically intermittently varying the presentation rate of the successively presenting means during the course of its successive presentations of the visual stimuli so as to deviate from the base presentation rate.

2. The tachistoscope according to claim 1 further comprising:

means for automatically varying the presentation latency time duration of the successively presenting means during the course of its successive presentations of the visual stimuli so as to deviate from the base presentation latency time duration.

3. The tachistoscope according to claim 2
wherein the means for automatically varying the presentation rate increases the presentation rate for at least two successive presentations of visual stimuli over presentation rate; and
wherein the means for automatically varying the latency time duration increases the latency time duration of the presentation of as few as one single visual stimuli over the base presentation latency time duration.

4. The tachistoscope according to claim 2
wherein the means for automatically varying the presentation latency time duration so varies the latency time duration in automatic response to a presence of some specific characteristic of an individual visual stimuli that is presented.

5. The tachistoscope according to claim 4
wherein the means for successively presenting visual stimuli successively presents groups of words; and
wherein the means for automatically varying the presentation latency time duration increases the latency time duration of the presentation of some particular single group of words out of many such group of words that the means for successively presenting visual stimuli successively presents.

6. The tachistoscope according to claim 4
wherein the means for successively presenting visual stimuli successively presents groups of words as text; and
wherein the means for automatically varying the presentation latency time duration increases the latency time duration of the presentation of a particular group of words which group of words exceeds in length of predetermined number of characters.

7. The tachistoscope according to claim 4
wherein the means for successively presenting visual stimuli successively presents groups of words as punctuated text; and
wherein the means for automatically varying the presentation latency time duration increases the latency time duration of the presentation of a particular group of words which group of words includes predetermined punctuation.

8. A tachistoscopic presentation method comprising:

successively preventing a tachistoscopic visual stimuli by a successively presenting means (i) at a base presentation rate between successive presentations, and (ii) at a base presentation latency time duration during which each visual stimuli is viewable; and first automatically intermittently varying the presentation rate of the successively presenting means during the course of its successive presentations of the visual stimuli so as to deviate from the base presentation rate.

9. The tachistoscope presentation method according to claim 8 further comprising:

second automatically varying the presentation latency time duration of the successively presenting means during the course of its successive presentations of the visual stimuli so as to deviate from the base presentation latency time duration.

10. The tachistoscopic method according to claim 9
wherein the first automatically varying comprises:
increasing the presentation rate for at least two successive presentations of visual stimuli over the base presentation rate; and wherein the second automatically varying comprises:
increasing the latency time duration of the presentation of as few as one single visual stimuli over the base presentation latency time.

11. The tachistoscopic method according to claim 9
wherein the second automatically varying comprises:
varying the latency time duration automatically in response to a presence of some specific characteristic of an individual visual stimuli that is presented.

12. The tachistoscopic method according to claim 11
wherein the successively presenting comprises:
successively presenting words; and wherein the second automatically varying comprises:
increasing the latency time duration of the presentation of a particular single word out of a number of words that are successively presented.

13. The tachistoscopic method according to claim 11
wherein the successively presenting comprises:
successively presenting groups of words as text; and
wherein the second automatically varying comprises:
increasing the latency time duration of the presentation of a particular group of words which group of words exceeds in length a predetermined number of characters.

14. The tachistoscopic method according to claim 11
wherein the successively presenting comprises:
successively presenting groups of words as punctuated text; and
wherein the second automatically varying comprises:
increasing the latency time duration of the presentation of a particular group of words which group of words includes predetermined punctuation.

15. A tachistoscope comprising:

means for successively presenting visual stimuli (i) at a base presentation rate between successive presentations, and (ii) at a base presentation latency time duration during which each visual stimuli is viewable; and means for automatically varying the presentation latency time duration of the successively presenting means during the course of its successive presentations of the visual stimuli so as to deviate from the base presentation latency time duration.

16. A tachistoscopic method comprising:

successively presenting with a tachistoscopic visual stimuli by a successively presenting means (i) at a base presentation rate between successive presentations, and (ii) at a base presentation latency time duration during which each visual stimuli is viewable;

first automatically varying the presentation latency time duration of the successively presenting means during the course of its successive presentations of the visual stimuli so as to deviate from, the base presentation latency time duration.

17. An instructional method for teaching reading by a tachistoscopic comprising:

organizing a body of text into lines each containing a multiplicity of words;

dividing the multiplicity of words upon each line into successive groups of words with each group containing a plurality of words; and automatically transitorily successively presenting the successive groups of words, one group at a time, at a rate that is not uniform;

wherein if a student-user viewing the presenting is to read the text then it is necessary that the student-user should read each successive group of words at and upon, and only at and only upon, the time of its transitory presentation because both before and after its transitory presentation each group of words is not visible to the student-user.

18. The method according to claim 17, wherein after the step of transitorily successively presenting all groups of words of the entire text further comprises:

testing reading comprehension by interrogating the student-user regarding information which was within the text, which information was transitorily presented, and which information, at the time of the interrogating, is no longer visible to the student-user.

19. The method according to claim 18 wherein the testing reading comprehension is by successively interrogating the student-user regarding information which was within successive groups of words as presented, earlier interrogations being regarding information which was within earlier-presented groups of words while later interrogations are regarding information which was within later-presented groups of words.

20. The method according to claim 19 wherein the testing reading comprehension by successively interrogating is in greater than 50% coverage of all groups of words successively presented;

wherein greater than 50% of the groups of words must be understood and remembered if all interrogations are to be correctly answered by the student-user.

21. The method according to claim 18 wherein after the step of testing reading comprehension further comprises:

computing comprehension level as the percentage of interrogations correctly answered by the student-user.

22. The method according to claim 21 wherein after the slip of the computing further comprises:

displaying a reading speed and the computed comprehension level of the student-user.

23. An instructional method for teaching reading by a tachistoscope comprising:

organizing a body of text into lines each containing a multiplicity of words;

dividing the multiplicity of words upon each line into successive groups of words with each group containing a plurality of words;

transitorily successively presenting the successive groups of words one group at a time;

predetermining a base rate of the transitorily successively presenting; and automatically varying the rate of the transitorily successively presenting about the base rate at intervals during the conduct of the transitorily successively presenting;

wherein if a student-user viewing the presenting is to read the text then it is necessary that the student-user should read each successive group of words at and upon, and only at and only upon, the time of its transitory presentation because both before and after its transitory presentation each group of words is not visible to the student-user.

24. The method according to claim 23 wherein the varying is periodic and of a magnitude less than twenty-five percent of the base rate.

25. The method according to claim 23 wherein the transitorily successively presenting is in an automated manner by act of computer generation of visual information upon an operator interface device.

26. To the computerized flash card instructional method of momentarily dynamically presenting information to a student-user upon a flash card and then quizzing the student-user about the information presented when the information is no longer visible to the student-user, an improvement directed to developing the skills necessary for the student-user's correct response at a time separately from, and priorly to, the student-user's required use of these response skills in answering the quizzing, the improvement to the instructional method comprising:

primarily statically presenting information to a student-user; while preliminarily quizzing the student-user about the information while statically presented information is still visible to the student-user, the primarily statically presenting and the preliminarily quizzing simultaneously continuing until the student-user attains a correct response, this correct response indicating that the student-user has acquired the skills necessary to enable a correct response regardless of whether the information is retained or understood by the student-user; then continuing with the momentarily dynamically presenting and with the quizzing;

wherein a student-user response to the quizzing is wrong because of various student-user incapacities but not because the student-user is functionally incapable of attaining a correct response, the student-user having priorly proved during the preliminarily statically quizzing that the student user can so attain a correct response.

27. The improvement to the instructional method according to claim 26
wherein the momentarily dynamically presenting and then the quizzing are repeated in sequence until the correct student-user response is obtained;
wherein since the student-user previously attained the correct response to the preliminarily quizzing during static presentation of the information the effect of repeating the momentarily dynamically presenting and the quizzing is to urge the student-user to mentally retain the information during the time duration between the momentarily dynamically presenting and the subsequent quizzing.

28. The improvement to the instructional method according to claim 27
wherein the time duration between the momentarily dynamically presenting and the subsequent quizzing is less than ten seconds;
wherein the student-user's mental retention being urged is short term retention.

29. The improvement to the instructional method according to claim 26 while after the momentarily dynamically presenting and then the quizzing is further comprising:
further statically presenting additional information, related in content to the momentarily dynamically presented information, after each correct response to the quizzing;
wherein proximate to each correct response, evidencing retention, the student-user is presented with the additional information, therein urging that this additional information likewise be retained by the student-user.

30. The improvement to the instructional method according to claim 26
wherein the primarily statically presenting and the momentarily dynamically presenting is of words; and
wherein the preliminarily quizzing and the quizzing is of the words' spellings.

31. The improvement to the instructional method according to claim 29
wherein the primarily statically presenting and the momentarily dynamically presenting is of words;
wherein the preliminarily quizzing and the quizzing is of the words' spellings; and wherein the further statically presenting is of words' definitions.

32. The improvement to the instructional according to claim 26
wherein the primarily statically presenting preliminarily quizzing momentarily dynamically presenting and quizzing are all performed in an automated manner by a machine.

33. An institutional method for teaching spelling by a tachistoscope comprising:
statically presenting a word to a student-user; while
preliminarily testing the student-user to spell the word correctly while the word is still statically visible to the student-user;
continuing with the statically presenting and preliminarily testing of a plurality of words until all have been correctly spelled by the student-user; then
dynamically momentarily presenting the word to the student-user; then
testing the student-user to spell the word while it is no longer visible to the student-user;
continuing with the dynamically momentarily presenting and then with the testing for the plurality of words, one at a time, until all have been correctly spelled by the student-user.

34. The institutional method according to claim 33 wherein after the step of testing further comprising:
statically presenting the definition of the word;
wherein the continuing is with the dynamically momentarily presenting of the word, then testing spelling of the word, and then statically presenting the word's definition for the plurality of words, one at a time.

35. The instructional method according to claim 34 further comprising:
testing the student-user to (i) use and (ii) spell each of the plurality of words, one at a time, appropriately to the individual definitions of such words.

36. The instructional method according to claim 36 further comprising:
presenting results of the combined use and spelling testing to the student-user.

37. The instructional method according to claim 33 wherein the statically presenting of the word, the preliminarily testing, the dynamically momentarily presenting, and the testing are all performed in an automated manner by the tachistoscope.

* * * * *